United States Patent [19]
Okazaki et al.

[11] Patent Number: 5,694,538
[45] Date of Patent: Dec. 2, 1997

[54] MEMORY REWRITING APPARATUS

[75] Inventors: Katsuyoshi Okazaki; Noriyuki Oka; Takasi Kisibe; Takeo Ota, all of Kawasaki, Japan

[73] Assignee: Fujitsu Limited, Kawasaki, Japan

[21] Appl. No.: 569,944

[22] Filed: Dec. 8, 1995

[30] Foreign Application Priority Data

Mar. 30, 1995 [JP] Japan ................................. 7-072829

[51] Int. Cl.⁶ ............................................... G06F 11/00
[52] U.S. Cl. ........................................... 395/182.13
[58] Field of Search .................... 395/182.04, 182.13, 395/182.14, 182.15, 183.17, 183.18, 600; 371/10.2, 10.3

[56] References Cited

U.S. PATENT DOCUMENTS 5,530,673  6/1996  Tobitz et al. ........................... 371/21.1

*Primary Examiner*—Vincent P. Canney
*Attorney, Agent, or Firm*—Staas & Halsey

[57] ABSTRACT

When a rewriting instruction, which designates a specified rewriting bank is received, a rewrite processing unit copies data of the rewriting bank into a backup bank and, thereafter, writes new data prepared in a work memory such as an RAM or the like and clears the backup bank after completion of the writing operation. In this instance, flag information indicating whether data is valid or invalid is set into a plurality of banks of a flash memory. A restarting process after the writing process was interrupted is recovered by checking the flag information in all of the banks before the start of the rewriting operation and by executing the rewriting process from the beginning or in the middle of the process.

20 Claims, 21 Drawing Sheets

FIG. 6

| | 48 | 50 | 52 | 54 | 58 | 56 |
|---|---|---|---|---|---|---|
| 0x0000 | CORRECTION DATA INFORMATION FLAG 34 | FORMAT TYPE 56 | EDITION NUMBER 78 | REWRITE DESIGNATION BANK 9A | THE NUMBER OF REWRITING TIMES (N) BC | CHECKSUM F |
| 0x0010 | START ADDRESS 1 | | BYTE LENGTH 1 | UNUSED | | |
| 0x0020 | OLD DATA (1-BYTE LENGTH) | | | | UNUSED | |
| 0x0030 | NEW DATA (1-BYTE LENGTH) | | | | UNUSED | |
| 0x0040 | START ADDRESS 2 | | BYTE LENGTH 2 | UNUSED | | |
| 0x0050 | OLD DATA (2-BYTE LENGTH) | | | | UNUSED | |
| 0x0060 | NEW DATA (2-BYTE LENGTH) | | | | UNUSED | |
| ... | ... | | | | | |
| 0x30*N−0x20 | START ADDRESS N | | BYTE LENGTH N | UNUSED | | |
| 0x30*N−0x10 | OLD DATA (N-BYTE LENGTH) | | | | | UNUSED |
| 0x30*N | NEW DATA (N-BYTE LENGTH) | | | | | UNUSED |

| Address | 0 | 34 | 50 | 56 | 52 | 78 | 54 | 9A | 58 | BC | 56 F |
|---|---|---|---|---|---|---|---|---|---|---|---|
| | 48 CORRECTION DATA INFORMATION FLAG | | FORMAT TYPE | | EDITION NUMBER | REWRITE DESIGNATION | | DESIGNATION BANK | THE NUMBER OF REWRITING TIMES (N) | | CHECKSUM {55 |
| 0x0010 | START ADDRESS 1 | | | | | | | BYTE LENGTH 1 | | UNUSED | |
| 0x0020 | NEW DATA (1-BYTE LENGTH) | | | | | | | | | | |
| 0x0030 | START ADDRESS 2 | | | | | | | BYTE LENGTH 2 | | UNUSED | |
| 0x0040 | NEW DATA (2-BYTE LENGTH) | | | | | | | | | | |
| 0x0050 | | | | | | | | | | UNUSED | |
| 0x0060 | ... | | | | | | | | | | |
| 0x30*N-0x20 | START ADDRESS N | | | | | | | BYTE LENGTH N | | UNUSED | |
| 0x30*N-0x10 | NEW DATA (N-BYTE LENGTH) | | | | | | | | | | |
| 0x30*N | | | | | | | | | | UNUSED | |

FIG. 16

| SEQUENCE SEQ | | STATE OF REWRITE FLAG | | STATE OF DATA IN BANK | | PROCESS WHEN REACTIVATED |
|---|---|---|---|---|---|---|
| NO | NAME OF PROCESS | REWRITING BANK FLA | BACKUP BANK FLB | REWRITING BANK | BACKUP BANK | |
| 1 | CLEAR BACKUP BANK | 3 (OLD DATA IS VALID) | ALL F (CLEAR IS VALID) | OLD DATA | ALL F | RESTART REWRITING FROM SEQUENCE 1 BY REWRITING INSTRUCTION |
| 2 | READ CHECK OF BACKUP BANK | | | | | |
| 3 | COPY BACKUP BANK | | | | | |
| 4 | READ CHECK OF BACKUP BANK | | | | | |
| 5 | CLEAR REWRITING BANK | UNDEFIND | 5 (BACKUP IS VALID) | UNDEFIND | OLD DATA | SINCE STATE OF FLASH MEMORY CANNOT BE DISCRIMINATED (DISCRIMINATION WHETHER DATA IN REWRITING BANK IS NEW OR OLD), RECOVERY IS IMPOSSIBLE |
| 6 | READ CHECK OF REWRITING BANK | ALL F (CLEAR IS VALID) | | ALL F | | RESTART REWRITING FROM SEQUENCE 5 BY REWRITING INSTRUCTION (WHEN ADDRESS SWITCHING FUNCTION EXISTS, ADDRESS MAPPING IS RETURNED TO ORIGINAL STATE, AND THEREFORE, RESTART REWRITING FROM SEQUENCE 5) |
| 7 | REWRITE REWRITING BANK | | | | | |
| 8 | READ CHECK OF REWRITING BANK | 3 (NEW DATA IS VALID) | UNDEFIND | NEW DATA | UNDEFIND | |
| 9 | CLEAR BACKUP BANK | | ALL F (CLEAR IS VALID) | | ALL F | RESTART REWRITING FROM SEQUENCE 9 BY REWRITING INSTRUCTION |
| 10 | READ CHECK OF BACKUP BANK | | | | | |

MEMORY REWRITING APPARATUS

BACKGROUND OF THE INVENTION

The invention relates to an apparatus for rewriting a non-volatile memory known as a flash memory which can be rewritten on a bank unit basis and, more particularly, to an apparatus for rewriting a non-volatile memory which can normally restart a rewriting process even when the rewriting process is interrupted by a power shut-off or the like in the middle of the rewriting process.

Hitherto, a non-volatile memory is used in a portion such as a program memory or the like in which the user doesn't want to delete the memory contents when a power source of an apparatus is shut off. In such a non-volatile memory, easiness of a reconstruction in a field has been demanded. In recent years, however, a memory which can be rewritten by a program is required. An EEPROM is known as a non-volatile memory which can be rewritten by a program. The EEPROM can be rewritten on a byte unit basis. However, in recent years, in order to improve the reliability of a computer system, the use of a non-volatile memory in a main memory of a processor, a shared memory of a multi-processor, or the like is requested and the realization of a large capacity and low costs of the non-volatile memory are demanded. Under such circumstances, it is presumed that the flash memory will be used in place of the EEPROM that is a main stream at present.

The flash memory is ordinarily constructed by a plurality of banks. Although each bank can be erased in a lump by a control of a program, it cannot be erased on a byte unit basis. In a state in which no data is stored in the flash memory, data can be written on a byte unit basis by a program control of a CPU. However, in a state in which data has once been written, data cannot be overwritten on a byte unit basis. In order to rewrite on a byte unit basis, it is necessary to rewrite in accordance with the following procedure.

I. All of the data of the rewriting bank is copied into a work area.
II. A rewriting data portion is buried into the data copy in the work area.
III. The rewriting bank is cleared.
IV. The data copy of the work area is written into the whole area of the rewriting bank.

Further, although the processes of I to IV are performed by the execution of a program by the processor, actually, a hardware signal of the flash memory has to be controlled in accordance with a specified sequence. Therefore, an access from the processor to the flash memory must not be performed for a period of time of rewriting on the byte unit basis. However, in the rewriting process of the flash memory by the execution of the program of the processor, since a process for deleting the rewriting bank is certainly performed, there is a case where when an interruption of the process occurs due to an abnormality such as a power shut-off or the like in the middle of the rewriting process, the data stored in the flash memory is not guaranteed. Particularly, in case of using the flash memory as a program memory of the processor, since various programs which are necessary for a run of the processor have been stored, there is a possibility such that an initial activating program or the like which is necessary to activate the apparatus is extinguished by the interruption in the middle of the rewriting process. In such a case, there is a fear such that even if the power source is recovered, the apparatus cannot be activated again.

SUMMARY OF THE INVENTION

According to the invention, there is provided a memory rewriting apparatus of a high reliability in which even when an abnormality such as a power shut-off or the like occurs in the middle of a rewriting process of a flash memory, an extinction of data is prevented, thereby enabling the rewriting process to be normally restarted.

The memory rewriting apparatus of the invention relates to a memory which is constructed by a plurality of banks and which can be rewritten on a bank unit basis. Such a memory is known as a flash memory. A backup bank is allocated to at least one of a plurality of banks of the flash memory. When a rewrite processing unit which is realized by a program function receives a rewriting instruction in which a specific rewriting bank is designated, after data of the rewriting bank was copied to a backup bank, the rewrite processing unit writes new data prepared in a work memory such as an RAM or the like and, after completion of the writing, clears the backup bank. A flag setting unit sets flag information indicating whether the data is valid or invalid into a plurality of banks of the flash memory. Namely, with respect to the backup bank, the invalid flag is set in an initial state or an erasing state of the copy and a valid flag is set in a backup state in which the data has been copied. With regard to the rewriting bank, the invalid flag is set in the initial state or erasing state and the valid flag is set in a data writing state. The rewrite processing unit checks flag information in each bank at the start of the rewriting and starts the rewriting process only in the case where all of the banks excluding the backup bank are valid. When any one of the banks is invalid, the rewrite processing unit finishes the process as a memory abnormality.

In a restarting process after the writing process was interrupted, the rewrite processing unit checks the flag information of all of the banks before the rewriting process is started. When the rewriting bank is valid and the backup banks are also valid, the rewrite processing unit executes the following processes.

I. The data in the rewriting bank is copied to the backup bank.
II. New data is written into the rewriting bank.
III. The backup bank is cleared.

When the rewriting bank is invalid and the backup bank is valid, since it is unnecessary to copy the data of the rewriting bank into the backup bank, the following processes are executed.

I. New data is written into the rewriting bank.
II. The backup bank is cleared.

Further, when the rewriting bank is valid and the backup bank is invalid, the copy of the data of the rewriting bank into the backup bank and the writing of the new data into the rewriting bank have normally been finished, so that it is sufficient to merely clear the backup bank.

After the data of each bank was written, copied, or cleared, the rewrite processing unit verifies the data in the bank and judges a validity every state change of the bank contents. When it is confirmed that the bank contents are normal, the next process is executed, thereby promptly coping with a hardware fault of the flash memory in the middle of the rewriting operation. When the data of the rewriting bank is copied into the backup bank, the rewrite processing unit stores information indicative of a backup source. Further, when the rewriting instruction is recognized by the processor, in a state in which the rewriting program of the same bank is loaded into the work memory by executing the rewrite activating program stored in a specified bank in the flash memory, the rewriting program is executed by the processor, thereby realizing the rewrite processing unit and flag setting unit. In this case, it is desirable to store the rewrite activating program and rewriting program into the same bank. A certain specified bank in the flash memory is set to a rewrite inhibition bank, an initial activating program to activate an initial process to turn on the power source of the apparatus is stored into the rewrite inhibition bank, and at the turn-on of the power source of the apparatus, the processor starts the initial process by the initial activating program in the flash memory. At the time of the initial process in association with the turn-on of the power source, the processor discriminates the flag information of all of the banks in the flash memory. When the backup bank is valid, the data in the backup bank is rewritten to the bank of the backup source whose rewriting operation has been interrupted. After that, the next process is executed.

On the other hand, it is also possible to cope with the storage bank of the initial activating program by an address converting mechanism without setting such a storage bank to the rewrite inhibition bank. Namely, the initial activating program has been stored in a certain specified bank in the flash memory. At the time of the initial process in association with the turn-on of the power source, the processor discriminates the flag information of all of the banks in the flash memory. In this instance, when the storage bank of the initial activating program is invalid and the backup bank is valid, an access address of the initial activating program into the storage bank by the processor is address converted into the backup bank. The initial activating program in the backup bank is loaded into the work memory. After that, the initial process is started.

The rewrite processing unit inhibits accesses other than the rewriting to the flash memory during the rewriting operation. In this case, the program of the bank which is activated by another access during the rewriting operation is copied into the work memory and the access to the flash memory during the rewriting operation is inhibited, so that a necessary program can be activated in the work memory.

In case of a multi-processor construction in which a plurality of processors share the flash memory and work memory and operate, a specified processor to execute the rewriting process is set to a main processor. When receiving the rewriting instruction, the main processor copies the rewriting program in the flash memory to realize the rewrite control unit into the work memory. After it was copied, the main processor instructs another processor to jump to the rewriting program in the work memory when accessing to the flash memory. Another processor which has received such an instruction jumps to the rewriting program in the work memory. After that, the completion of such a jump is notified to the main processor and the processing routine advances to an infinite loop. After the main processor confirmed that all of the other processors had jumped to the rewriting program in the work memory, the main processor itself also jumps to the rewriting program and starts the rewriting process of the flash memory. Thus, the access from another processor during the rewriting process of the flash memory by the main processor is certainly inhibited, thereby preventing the interruption of the rewriting process. As another form of inhibiting the access from another processor in the multi-processor construction, it is also possible to construct in a manner such that when the rewriting instruction is received, the main processor copies the rewriting program in the flash memory to realize the rewrite processing unit into the work memory and, after that, all of the other processors are halted and, after completion of the halt, the main processor jumps to the rewriting program in the work memory and starts the rewriting process.

The rewrite processing unit discriminates the rewriting form added to new data for rewriting which has been prepared in the work memory. When the rewriting form indicates the rewriting of all of the data in the rewriting bank, the new data is used as it is and the rewriting process of the bank unit of the flash memory is started. When the rewriting form instructs the rewriting of partial data in the rewriting bank, all of the data in the rewriting bank is copied into the work memory and a part of them is rewritten by new data. After that, the rewriting process of the flash memory is started by using the data after completion of the rewriting. Further, in the case where the rewriting form instructs the rewriting of partial data in the rewriting bank and also instructs the presence of the old data, all of the data in the rewriting bank is copied into the work memory and the old data is discriminated. When the old data is normal, the rewriting process of the flash memory is started by using the data a part of which was rewritten by the new data. When the old data is abnormal, it is judged that a failure has occurred in the flash memory, so that the rewriting process is finished as an abnormality. The flash memory holds the parity of the data in each bank into the same bank, thereby enabling the data to be rewritten for only the inside of the bank as a target.

According to such a rewriting apparatus of the flash memory of the present invention, in the case where an interruption of the process occurs in the middle of the rewriting process, by checking the flag information of each bank at the time of the restart of the process, the states of the rewriting bank and backup bank are recognized and by restarting the rewriting process from the beginning or the halfway, the rewriting process can be normally finished. Therefore, even if the rewriting process is interrupted in the middle, the extinction of the data in the rewriting bank can be prevented as much as possible. Even when the flash memory is rewritten, the storage data such as a program or the like can be guaranteed. Not only in the rewriting by the single processor, but also in the multi-processor construction, by allocating the rewriting process to a specified processor and by inhibiting the access of another processor during the rewriting operation, the rewriting of the flash memory that is used as a shared memory can be performed and the data can be guaranteed.

The above and other objects, features, and advantages of the present invention will become more apparent from the following detailed description with reference to the drawings.

BRIEF DESCRIPTION OF THE DRAWINGS

FIG. 6 is a format explanatory diagram of rewriting data having old data in the partial rewriting of the banks;

FIG. 7 is a format explanatory diagram of rewriting data having no old data in the partial rewriting of the banks;

FIG. 16 is an explanatory diagram of the correspondence relations among a rewriting sequence, a rewrite flag, and a data state in the bank;

DETAILED DESCRIPTION OF THE PREFERRED EMBODIMENTS

[Rewriting process using single CPU]

Figure 1:
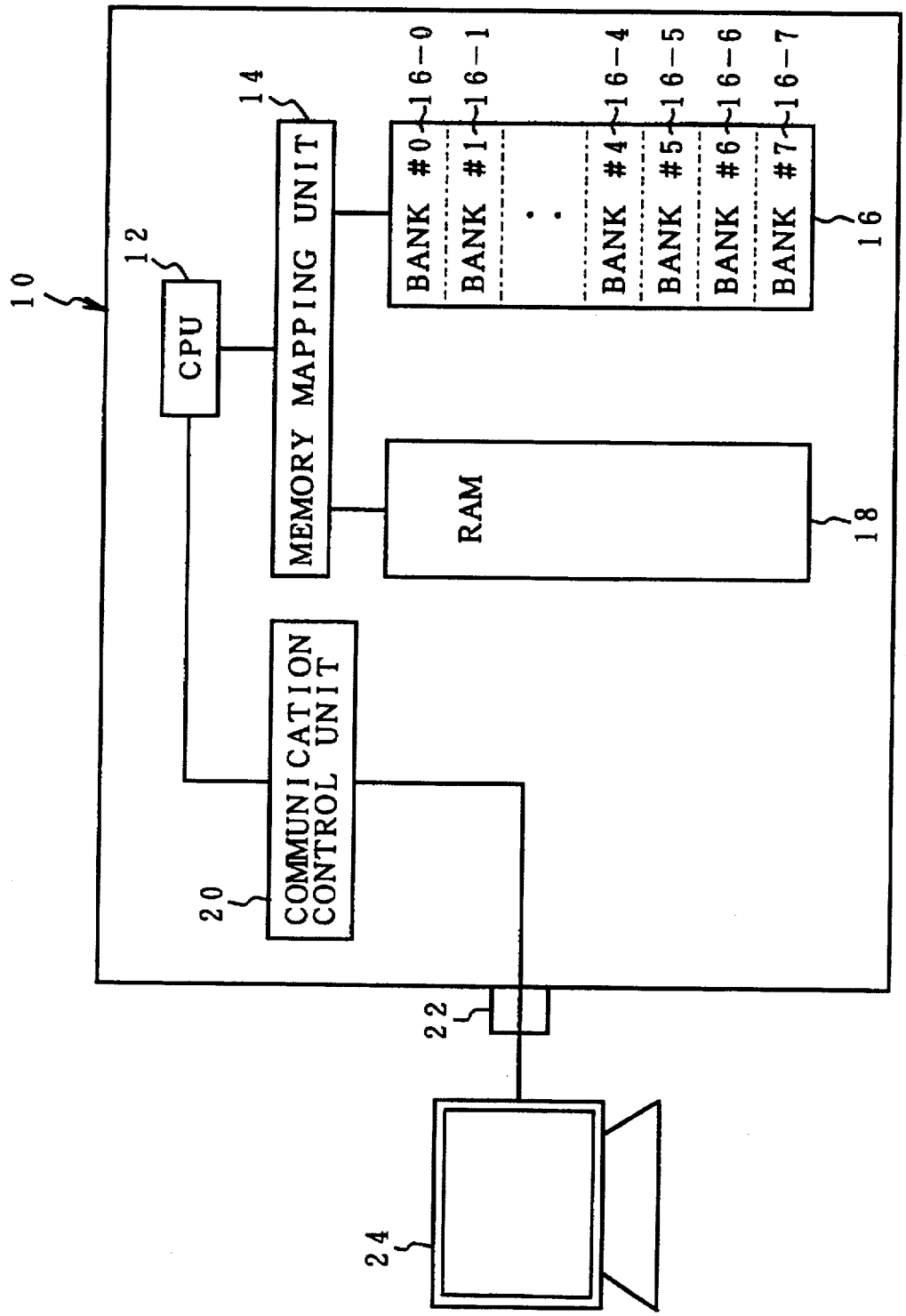
FIG. 1 is a block diagram of an operation environment of a single CPU construction.

FIG. 1 is a block diagram of an operation environment to which a flash memory rewriting apparatus of the invention is applied and shows an example of a single CPU construction having one CPU. One CPU 12 which operates as a processor is provided for an information processing apparatus 10. A flash memory 16 which operates as a program memory and an RAM 18 which operates as a work memory are connected to the CPU 12 through a memory mapping unit 14. A communication control unit 20 is provided for the CPU 12. An operator operation terminal 24 is connected to the communication control unit 20 through an external interface 22 such as an RS232C or the like. In the embodiment, the flash memory 16 is divided into eight banks 16-0 to 16-7 of bank Nos. #0 to #7. The flash memory 16 is a well-known memory and can be rewritten by the execution of a program by the CPU 12. In the rewriting of the flash memory 16, in a state in which no data is stored in the memory, data can be written on a byte unit basis. However, in a state in which the data has once been written in the memory, the overwriting of a byte unit cannot be performed and it is necessary to rewrite on a bank unit basis.

Figure 2:
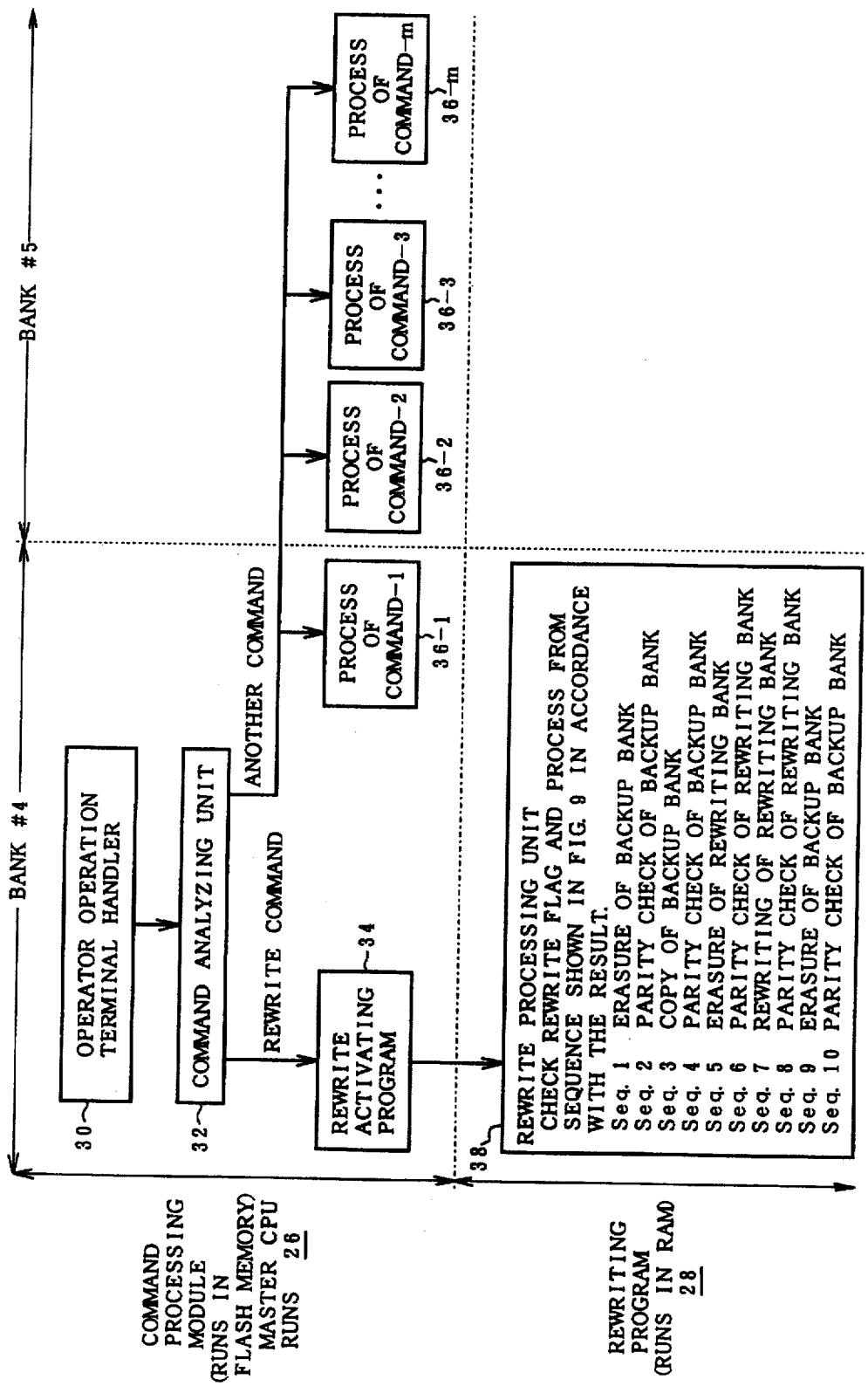
FIG. 2 is a block diagram showing a rewriting function in FIG. 1.

FIG. 2 is a diagram showing a rewriting function of the flash memory 16 in the information processing apparatus 10 in FIG. 1. In the embodiment, relative programs for executing the rewriting process have been stored in a bank 16-4 of bank No. #4 and a bank 16-5 of bank No. #5 in the flash memory 16. Specifically speaking, the rewriting function is constructed by a command processing module 26 and a rewriting program 28. The command processing module 26 is stored in the banks of bank Nos. #4 and #5. The command processing module 26 has an operator operation terminal handler 30, a command analyzing unit 32, a rewrite activating program 34, and further, processing units 36-1 to 36-m of commands 1 to (m) corresponding to the commands other than the rewriting. Among them, the operator operation terminal handler 30, command analyzing unit 32, rewrite activating program 34, and processing unit 36-1 of the command 1 as another command are stored in the bank of bank No. #4. The command processing module 26 having such a structure is executed by accessing the banks of bank Nos. #4 and #5 in the flash memory 16 by the CPU 12 in FIG. 1. Namely, the CPU 12 is run on the flash memory 16. The rewriting program 28 is activated by the rewrite activating program 34 of the command processing module 26. Although the rewriting program 28 has been stored in the bank of bank No. #4, it is loaded into the RAM 18 in FIG. 1 by the rewrite activating program 34 and, after that, the bank of bank No. #4 is accessed by the CPU 12, so that the rewriting program 28 is executed. Namely, the rewriting program 28 runs on the RAM 18. The rewriting program 28 realizes a function as a rewrite processing unit 38 shown by a block. The rewriting function by the rewrite processing unit 38 must certainly take a procedure of sequence Nos. seq. 1 to seq. 10 in accordance with the structure of the flash memory 16. When another access occurs in the middle of the sequence, the rewriting process is interrupted. The sequence by the rewrite processing unit 38 will be obviously explained hereinlater.

Figure 3:
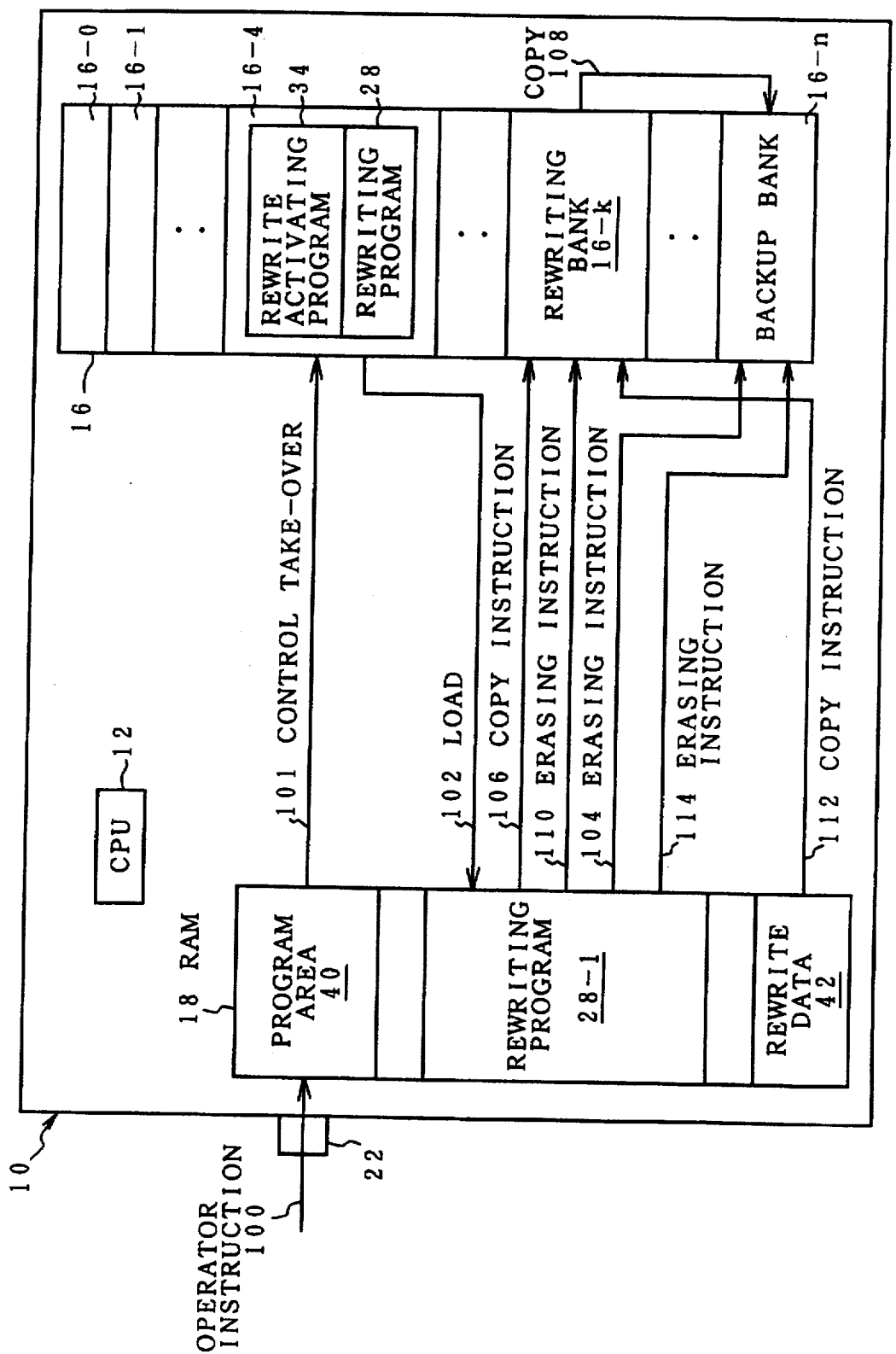
FIG. 3 is an explanatory diagram of a rewriting process in FIG. 1.

FIG. 3 shows a procedure for the rewriting process of the flash memory 16 in the information processing apparatus 10 in FIG. 1. After the operator prepared rewrite data 42 into a work area in the RAM 18 by the operation of the operator operation terminal 24, he issues a rewriting instruction 100 of a bank 16-k in the flash memory 16 through the external interface 22. In this instance, the CPU 12 runs by a program in a program area 40 in the RAM 18. When the CPU 12 recognizes the operator instruction 100, a control is shifted to the rewrite activating program 34 stored in the bank 16-4 in the flash memory 16. The rewrite activating program 34 (from the program area 40) to which the control was shifted loads (102) the rewriting program 28 stored in the same bank 16-4 into the RAM 18 and activates the loaded rewriting program 28-1. The rewriting program 28-1 activated in the RAM 18 executes an erasing process 104 of the backup bank 16-n which has been predetermined with respect to the flash memory 16. Subsequently, a copy instruction 106 is performed for the rewriting bank 16-k designated by the operator instruction 100. The contents of the rewriting bank 16-1 are copied (108) to a backup bank 16-n after completion of the erasing operation. Further, the rewriting program 28-1 performs an erasing instruction 110 to the rewriting bank 16-k after completion of the copying operation, thereby erasing the contents in the rewriting bank 16-k. Subsequently, a copy instruction 112 of the rewrite data 42 prepared in the RAM 18 into the rewriting bank 16-k is performed, thereby copying the rewrite data 42 to the rewriting bank 16-k. Lastly, the rewriting program 28-1 again executes an erasing instruction 114 to the backup bank 16-n, thereby erasing the contents in the backup bank 16-n. A series of rewriting processes are finished.

Figure 4:
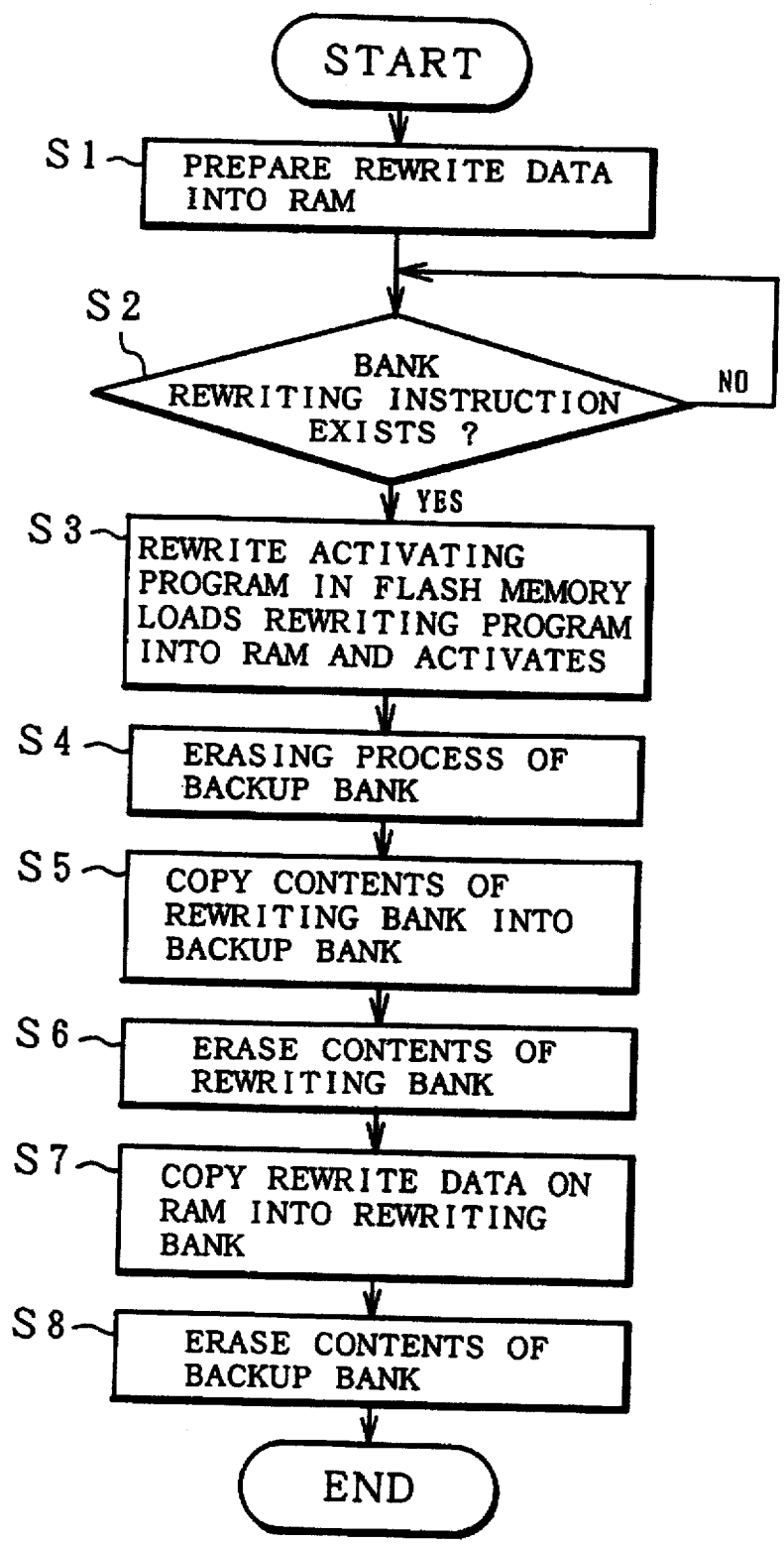
FIG. 4 is a flowchart for a rewriting process by the single CPU construction.

FIG. 4 is a flowchart for the rewriting process in FIG. 3. First in step S1, the rewrite data 42 is prepared in the RAM 18. In this state, the rewriting instruction is performed. When the rewriting instruction from the operator is discriminated in step S2, a processing routine is taken over to the rewrite activating program 34 in the flash memory 16 in step S3. The rewriting program of the same bank is loaded into the RAM 18 by the rewrite activation program 34, thereby activating as a rewriting program 28-1. The rewriting program 28-1 activated as mentioned above executes an erasing process of the backup bank 16-n in step S4. In step S5, the contents in the rewriting bank 16-k are subsequently copied into the backup bank 16-n. In step S6, the contents in the rewriting bank 16-k are erased. Thus, a preparation for rewriting the rewrite data 42 is completed. In step S7, the rewrite data 42 in the RAM 18 is copied into the rewriting bank 16-k. Lastly, in step S8, the contents in the backup bank 16-n are erased. A series of processes are finished.

[Rewriting format of correction data]

As shown in FIG. 3, before activating the rewriting program by instructing the rewriting operation, the operator needs to prepare the rewrite data 42 such as a correction program in which the version-up has been performed or the like in the RAM 18. Information such as a format type is provided in the rewrite data 42. By recognizing the format type by the rewriting program and by changing the process, a plurality of kinds of rewriting processes can be supported. In the embodiment, there are the following three format types of the rewrite data.

Figure 5:
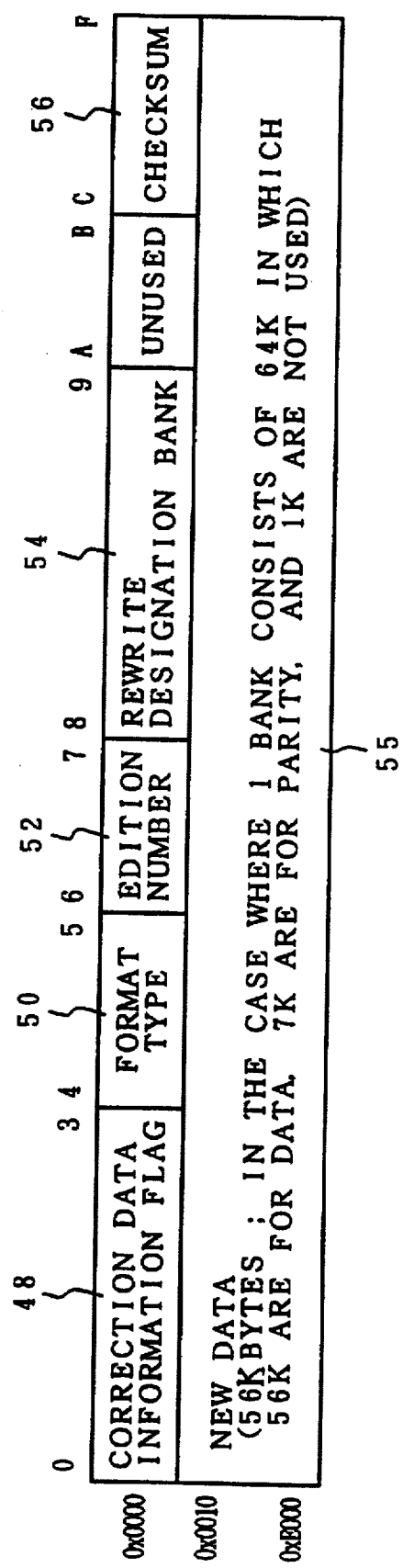
FIG. 5 is a format explanatory diagram of rewriting data in the rewriting of all banks.

Type 1: Bank whole rewriting type
Type 2: Type having old data in the bank partial rewriting
Type 3: Type having no old data in the bank partial rewriting FIG. 5 is an explanatory diagram of rewrite data in the case where the format type is set to the bank whole rewriting type. A correction data information flag 48, a format type 50, an edition number 52, a rewrite designation bank 54, and a checksum 56 are provided in an address area at the head of the rewrite data. A remaining area is a new data storage area 55. Information indicating that the data is rewrite information of the flash memory 16 is stored in the correction data information flag 48. For example, a fixed value of "0x55AA55AA" as a hexadecimal number is used. The format type 50 indicates the bank whole rewriting. For example, "0x0002" has been stored as information indicative of the bank whole rewriting. A new edition number of a rewriting target bank is stored in the edition number 52. A bank number as a rewriting target in the flash memory 16 is stored in the rewrite designation bank 54. A value obtained by adding new data in the new data storage area 55 on a byte unit basis is stored in the checksum 56. The checksum is used for checking the validity of the data. For example, now assuming that a size of one bank of the flash memory 16 is set to 64 kbytes, the data area 55 has data as many as 56 kbytes as a data area among 64 kbytes. Now, assuming that a size of one bank of the flash memory 16 is set to 64 kbytes, 56 kbytes are used for the data area, 7 kbytes are used for a parity, and 1 kbyte is not used. In case of the rewrite data of FIG. 5 as mentioned above, the rewriting program checks the format type 50. When it is judged that the format type is the bank whole rewriting type, all of the data in the data area 55 of the rewrite data is written into the rewriting bank designated by the rewrite designation bank 54.

FIG. 6 shows a format of the rewrite data in the case where the format type is the type having old data in the bank partial rewriting. With respect to the head area of the rewrite data, in a manner similar to the bank whole rewriting type in FIG. 5, the correction data information flag 48, format type 50, edition number 52, rewrite designation bank 54, and checksum 56 are provided. Further, the number of rewriting banks 58 is newly provided in the unused portion. To indicate that the format type is the type having old data in the bank partial rewriting, for example, "0x0001" is stored in the format type 50. The number (N) of data areas to be partially rewritten in one bank is stored in the number of rewriting banks 58 which was newly provided. Further, with regard to the data area 55, a start address and a byte length are designated every rewriting locations of 1 to (N) designated by the number of rewriting banks 58. Further, a storage area of the old data stored at present in the flash memory corresponding to such a portion and a storage area of new data to be newly written are provided. In FIG. 6, in correspondence to the number of rewriting times (1 to N), the data areas are designated by start addresses (1 to N) and byte lengths (1 to N). Areas of old data and new data are provided with respect to each of them. The maximum length of the old data and new data is equal to 16 bytes in the embodiment. Therefore, the continuous data exceeding 16 bytes have to be divided into other areas. The rewriting program checks the format type 50 of the rewrite data. When it is recognized that the format type is a type having old data in the partial rewriting, data to be actually written into the rewriting bank is formed for the rewrite data in FIG. 6 existing in the RAM 18 as a target. Upon formation of the data to be actually written into the rewriting bank, the present data in the rewriting bank in the flash memory is first copied as old data into the RAM 18 and new data as many as the designated byte length from the start address in the bank shown by the rewrite data in FIG. 6 is written. In this instance, whether the old data copied from the flash memory 16 is correct or not is judged by using the checksum. When the old data is not correct, an abnormality occurrence is warned to the operator and no more process is executed.

FIG. 7 shows a format of write data of the format type having no old data in the partial rewriting. In this case as well, the correction data information flag 48, format type 50, edition number 52, rewrite designation bank 54, and checksum 56 are provided in the head area of the rewrite data in a manner similar to the case of FIG. 6. To indicate that the format type 50 is a type having no old data in the partial rewriting, for example, "0x0000" is stored in the format type 50. A construction of the data area 55 is similar to that mentioned above except that the area of the old data in FIG. 7 is not used. As a result of the discrimination about the format type 50, when the rewriting program recognizes the type having no old data in the partial rewriting in FIG. 7, in a manner similar to the case of the format type having old data in the partial rewriting in FIG. 6, the present data in the rewriting bank in the flash memory 16 is copied into the RAM 18 and new data as many as the designated byte length from the start address in the bank shown by the rewrite data in FIG. 7 is written, thereby forming data to be actually written into the rewriting bank. In this case, in the type having no old data in the partial rewriting in FIG. 7, the discrimination about whether the old data is correct or not that is executed in case of the type having old data in FIG. 6 is not executed.

Figure 8:
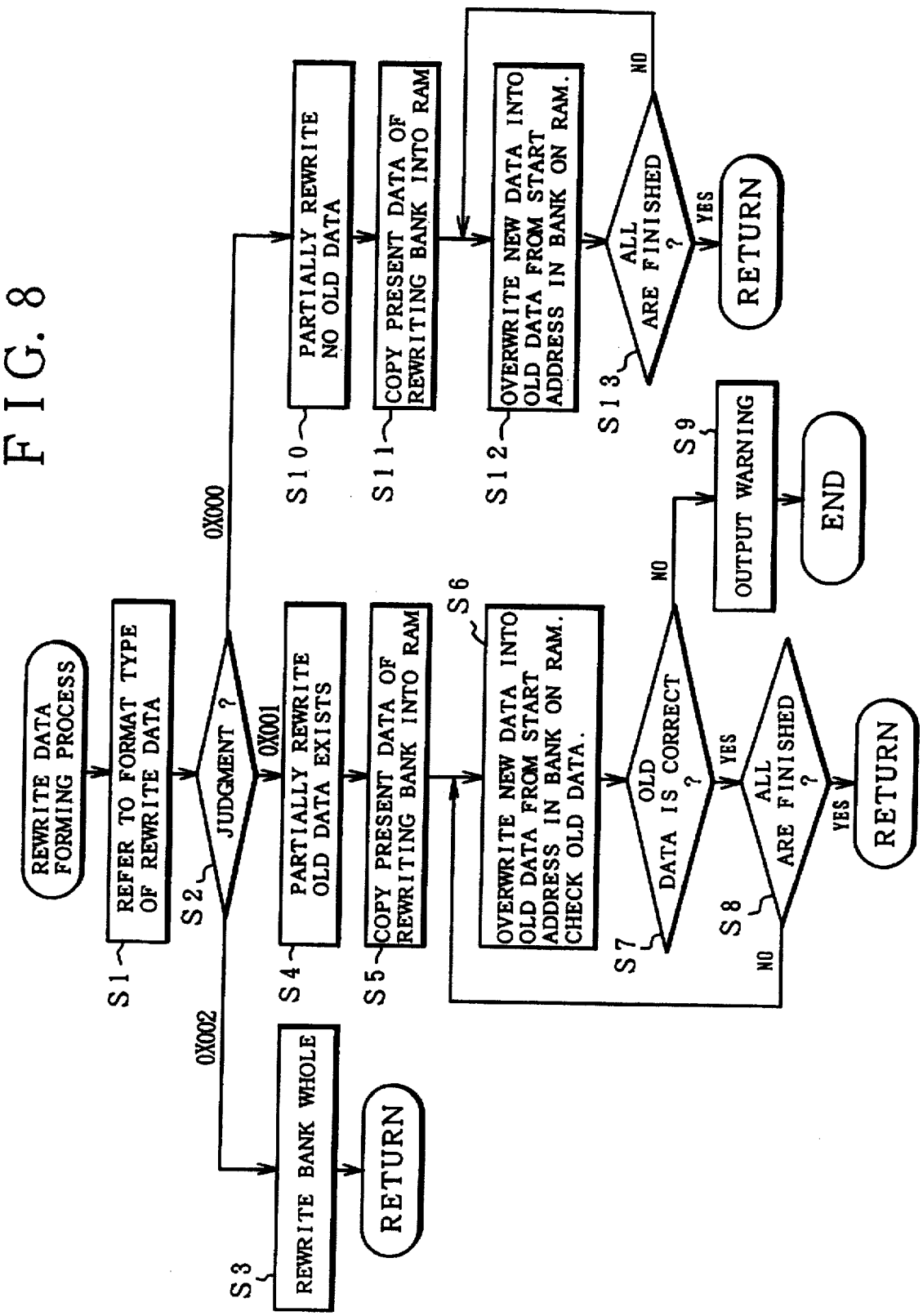
FIG. 8 is a flowchart for a rewriting data forming process according to the formats of FIGS. 5 to 7.

FIG. 8 is a flowchart for the rewrite data forming process for the three format types shown in FIGS. 5 to 7 as targets. First in step S1, the format type of the rewrite data is referred. In step S2, to which type the rewrite data belongs is judged. When the format type is set to "0x002", the bank whole rewriting is recognized in step S3. In this case, since the rewrite data can be used as it is, the processing routine is finished. In step S2, when the format type "0x001" is discriminated, in step S4, it is recognized that the format type is the type having old data in the partial rewriting. In step S5, the present data of the rewriting bank is copied into the RAM 18. In step S6, the new data is subsequently written into the old data which has been copied on a byte unit basis from the start address in the bank of the rewrite data in the RAM 18. In this instance, the validity of the old data is judged. In step S7, when it is recognized that the old data is correct, a check is made in step S8 to see if the processes have been finished for all data or not. Until the processes for all of the data are finished, the writing process of the new data for the old data in step S6 is repeated. On the other hand, when the old data is written by the new data in step S6, if there is an abnormality in the old data as a result of the discrimination of the old data, step S9 follows. An alarm is generated to the operator, thereby finishing the rewrite data forming process as an abnormality. Further, in step S2, when the format type "0x000" is discriminated, the type having no old data in the partial rewriting is recognized in step S10. In step S11, the present data of the rewriting bank is copied into the RAM 18. In step S12, the new data is written on a byte unit basis in accordance with the start address in the bank of the rewrite data prepared in the RAM. The writing of all data is finished in step S13 and the rewrite data forming process is finished.

[Rewriting process using multi-CPU]

Figure 9:
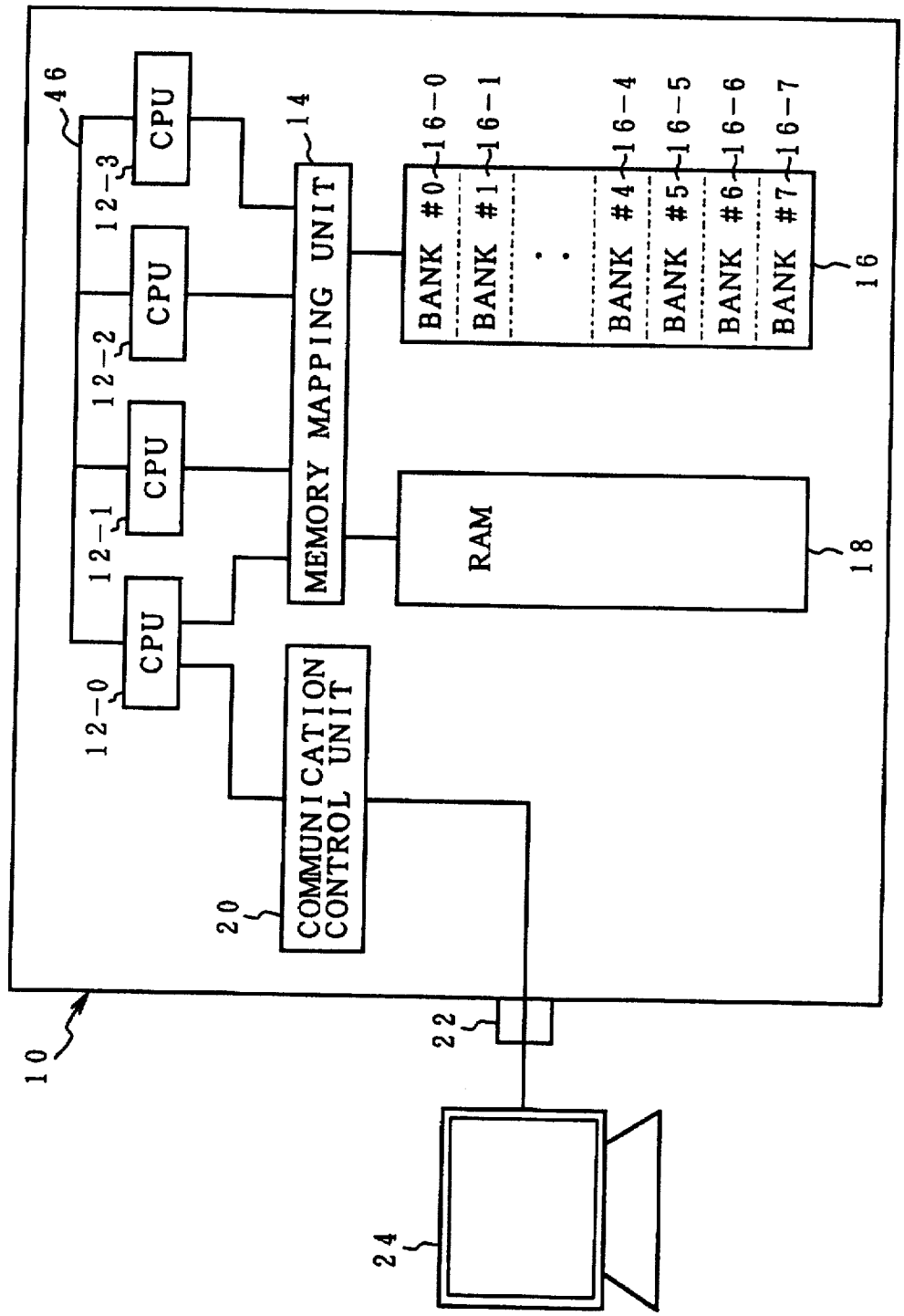
FIG. 9 is a block diagram of an operation environment of a multi-CPU construction.

FIG. 9 is a diagram showing an operation environment of a multi-processor construction to which the rewrite control of the flash memory of the invention is applied. In recent years, in order to realize a fault tolerance and a high processing speed of a computer system, a multi-processor system having a plurality of processors which run by the program in the shared memory is constructed. In the multi-processor system, the flash memory as a rewriting target of the invention is used as a shared memory.

In FIG. 9, the information processing apparatus 10 has a plurality of CPUs 12-0 to 12-3 as a multi-processor. The flash memory 16 which operates as a shared program memory and the RAM 18 which operates as a shared work memory are connected to the CPUs 12-0 to 12-3 through a memory mapping unit 14. Further, the CPUs 12-0 to 12-3 are connected by an inter-CPU interruption bus 46 and can mutually interlock processes. Since accesses to the flash memory 16 by the CPUs 12-0 to 12-3 compete and take a long time, by individually having an instruction cache mechanism, a memory accessing speed is raised. Among the plurality of CPUs 12-0 to 12-3, the CPU 12-0 is connected to the operation terminal 24 to perform a rewriting instruction of the flash memory 16 from the communication control unit 20 through the external interface 22. Therefore, the CPU 12-0 is allocated to a main CPU (main processor) for running the rewriting program to rewrite the flash memory 16.

Figure 10:
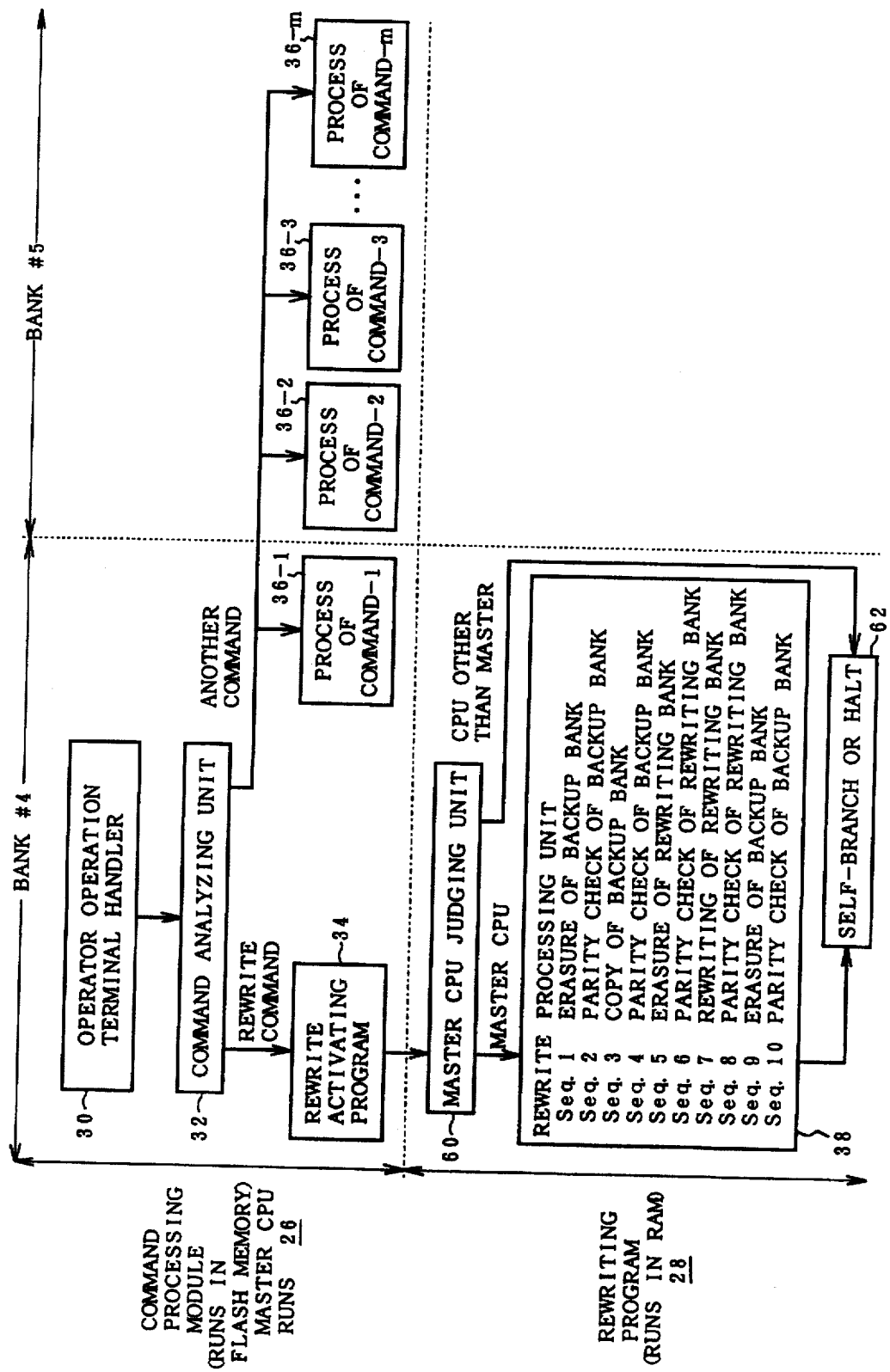
FIG. 10 is a block diagram of showing a rewriting function of FIG. 9.

FIG. 10 is a functional block diagram of the flash memory rewriting in the multi-processor construction in FIG. 9. In the functional block, in addition to FIG. 2 showing the single processor construction, a master CPU judging unit 60 and a self-branch or halt unit 62 to inhibit the accesses to the flash memory during the rewriting process of the CPUs other than the master CPU are newly provided on the rewriting program 28 side. As shown in FIG. 9, the master CPU judging unit 60 recognizes a physical connection slot with the operator operation terminal 24 to perform the rewriting instruction by the communication control unit 20 and judges that the CPU 12-0 is a master CPU when the rewriting instruction is received. The self-branch or halt unit 62 executes a process for inhibiting the accesses to the flash memory 16 from the other CPUs 12-1 to 12-3 for a period of time between the rewriting sequences Seq.1 and Seq.10 of the rewrite processing unit 38 which are realized by executing the rewriting program 28 loaded in the RAM 18 by the rewrite activating program 34 by the master CPU 12-0. The inhibition of the accesses by the CPUs 12-1 to 12-3 other than the master CPU 12-0 by the self-branch or halt unit 62 is executed before the master CPU 12-0 starts the rewriting process. The self-branch or halt instruction will be obviously described hereinlater.

Figure 11:
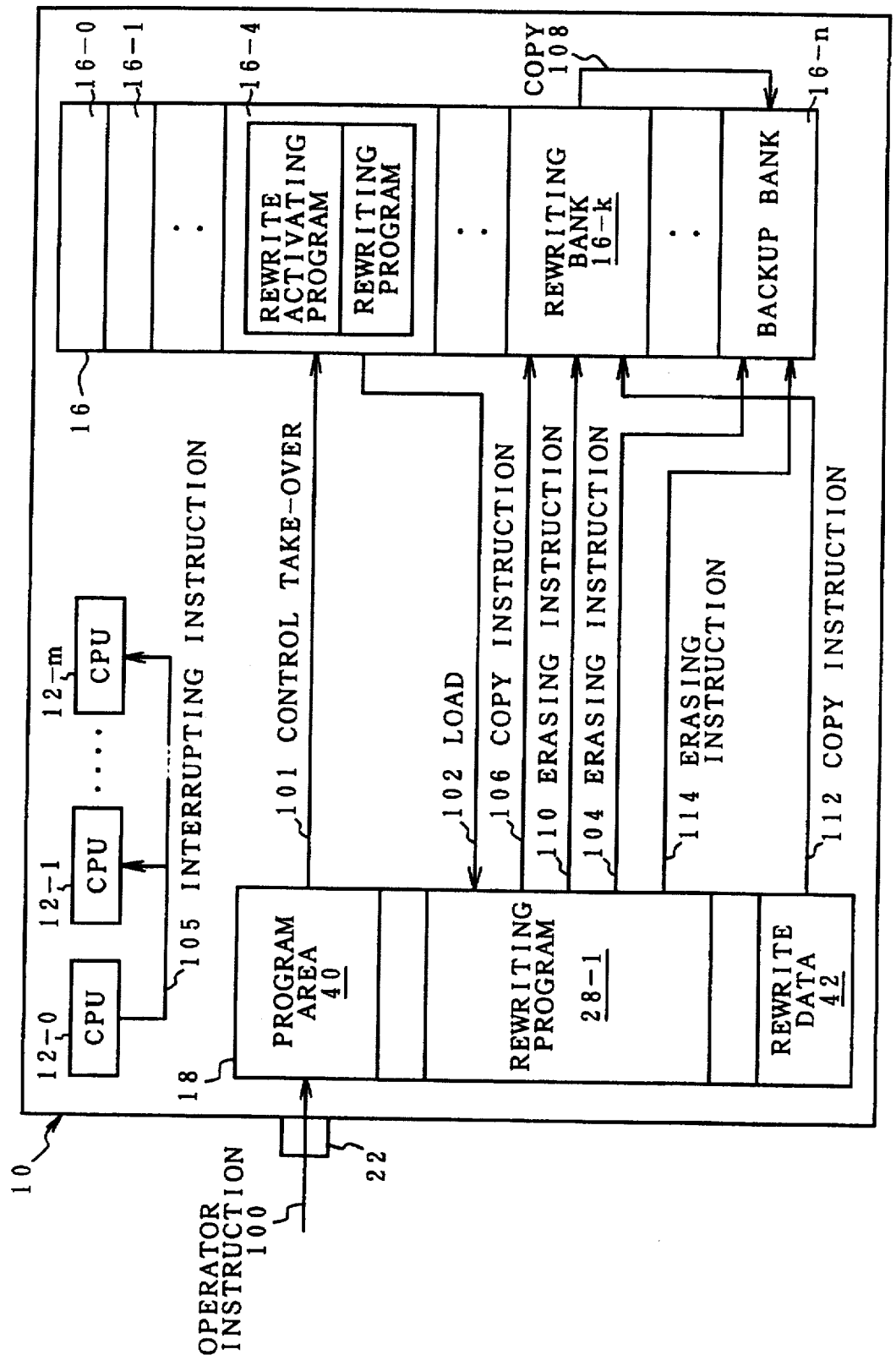
FIG. 11 is an explanatory diagram of a rewriting process in FIG. 9.

FIG. 11 shows the rewriting process of the flash memory 16 in the multi-processor construction in FIG. 9. As a multi-CPU, the CPUs 12-0 to 12-m are mentioned as an example. Among them, the CPU 12-0 is allocated to the master CPU. After the rewrite data 42 was prepared in the RAM 18, the operator issues the operator instruction 100 to rewrite the flash memory 16. In this instance, the CPUs 12-0 to 12-m operate by the program in the program area 40 loaded in the RAM 18. When there is the operator instruction 100, the master CPU 12-0 allocated as a master recognizes the rewriting instruction of the flash memory 16 and takes over (101) the process in the program area 40 to the rewrite activating program 34 stored in the bank 16-4 in the flash memory 16. By receiving the take-over 101 of the control, the rewrite activating program 34 is activated. The loading operation (102) for loading the rewriting program 28 stored in the same bank 16-4 into the RAM 18 as a rewriting program 28-1 and activating it is executed. In this instance, the master CPU 12-0 executes an interrupting instruction (105) to all of the other CPUs 12-1 to 12-m so as to execute all of the accesses to the flash memory 16 from the access of the rewriting program 28-1 loaded in the RAM 18. When accessing to the flash memory 16, the other CPUs 12-1 to 12-m which received the interrupting instruction 105 first jump to the rewriting program 28-1 in the RAM 18. After the interrupting instruction (105) was executed from the master CPU 12-0 to the other CPUs 12-1 to 12-m, when there is an access from any one of the CPUs to the rewriting program 28-1, the rewriting program 28-1 recognizes the processor number of the CPU. When such an access is executed from the CPU other than the master CPU 12-0, the process of such a CPU is inhibited. The inhibiting process of the access of the CPU to the flash memory 16 is executed by returning the processing routine to the infinite loop or by stopping by performing the halt instruction from the master CPU 12-0. Each time the inhibiting process of the access to the flash memory 16 from the other CPUs 12-1 to 12-m is executed, the rewriting program 28-1 reports the inhibition result to the master CPU 12-0. When the access inhibition to the flash memory 16 from all of the other CPUs 12-1 to 12-m is recognized, the master CPU 12-0 starts the rewriting process of the rewrite data 42 for the series of rewriting bank 16-k by the running of the rewriting program 28-1. The rewriting process is substantially the same as that in case of the single processor construction in FIG. 3. Namely, the rewriting program 28-1 performs the copy instruction (106) to the rewriting bank 16-k and copies (108) the contents in the rewriting bank 16-k into the backup bank 16-n. Subsequently, the clear (erasing) instruction (110) is performed to the rewriting bank 16-k and the contents are erased. Subsequently, by the copy instruction (112) of the rewrite data 42, it is written into the rewrite bank 16-k. Lastly, the clear instruction (114) is performed to the backup bank 16-n, thereby erasing the backup bank 16-n.

Figure 12:
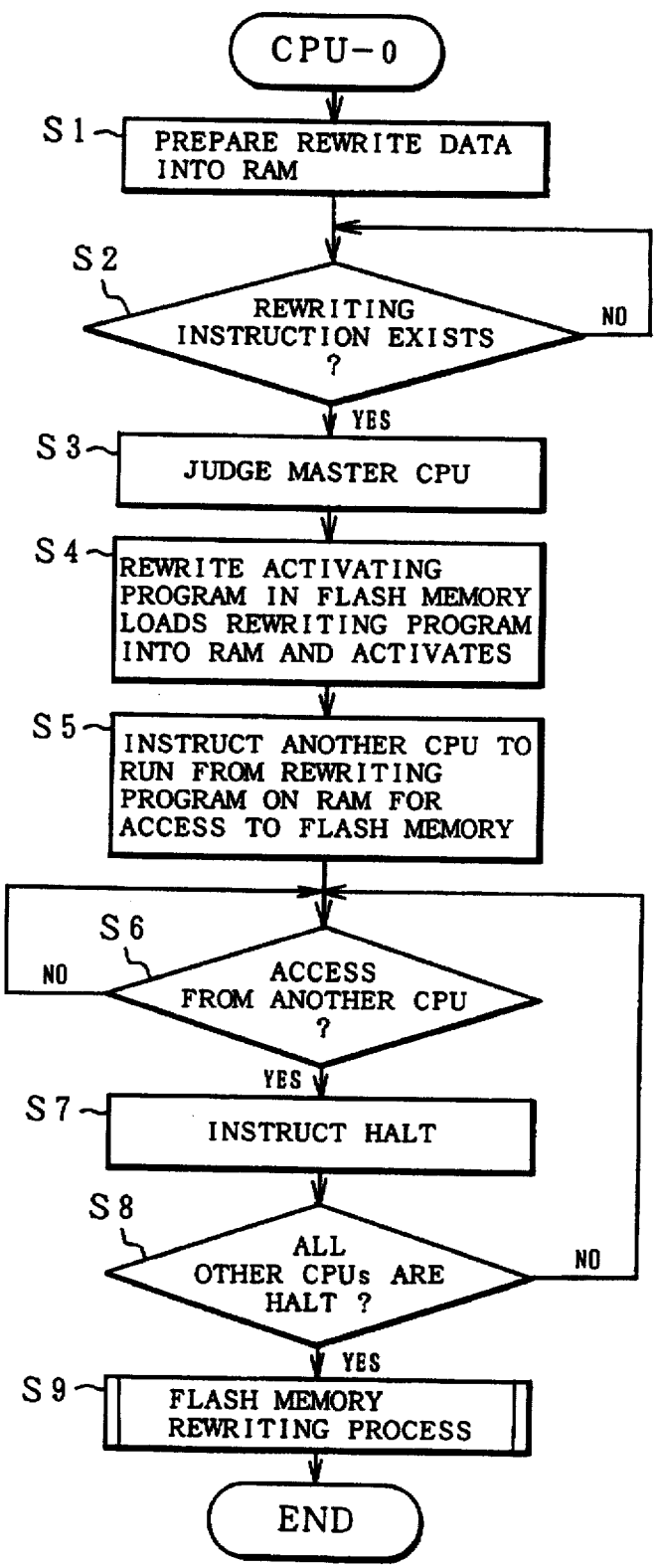
FIG. 12 is a flowchart for a rewriting process by the multi-CPU construction.

FIG. 12 is a flowchart for the rewriting process in the multi-processor construction of FIG. 10 and shows an example of an embodiment in which the master CPU performs a halt instruction to the other CPU, thereby inhibiting the access during the rewriting operation. First, the operator prepares the rewrite data into the RAM 18 in step S1 and executes the rewriting instruction. When the rewriting instruction is recognized in step S2, step S3 follows and the master CPU 12-0 is recognized. In step S4, the rewrite activating program of the flash memory 16 is activated and the rewriting program is loaded into the RAM and is activated. In step S5, the master CPU 12-0 instructs the other CPUs 12-1 to 12-m to run from the rewriting program in the RAM 18 with respect to the access of the flash memory 16. In step S6, the accesses from the other CPUs 12-1 to 12-m are recognized. When there is an access from any one of the other CPUs 12-1 to 12-m, the halt is instructed and the process is stopped in step S7. The processes in steps S6 and S7 are repeated until all of the other CPUs 12-1 to 12-m are halted in step S8. After completion of the halting processes of the CPUs other than the master CPU 12-0, step S9 follows and the rewriting process of the flash memory is started. The flash memory rewriting process has the same contents as those in steps S4 to S8 in FIG. 4. Even in the multi-processor construction as mentioned above, the accesses to the flash memory from the CPUs other than the master CPU are inhibited during the rewriting process of the flash memory 16 which is used as a shared memory. Therefore, the rewriting sequence is not interrupted in the middle and the rewriting process of the flash memory can be certainly normally finished.

Figure 13:
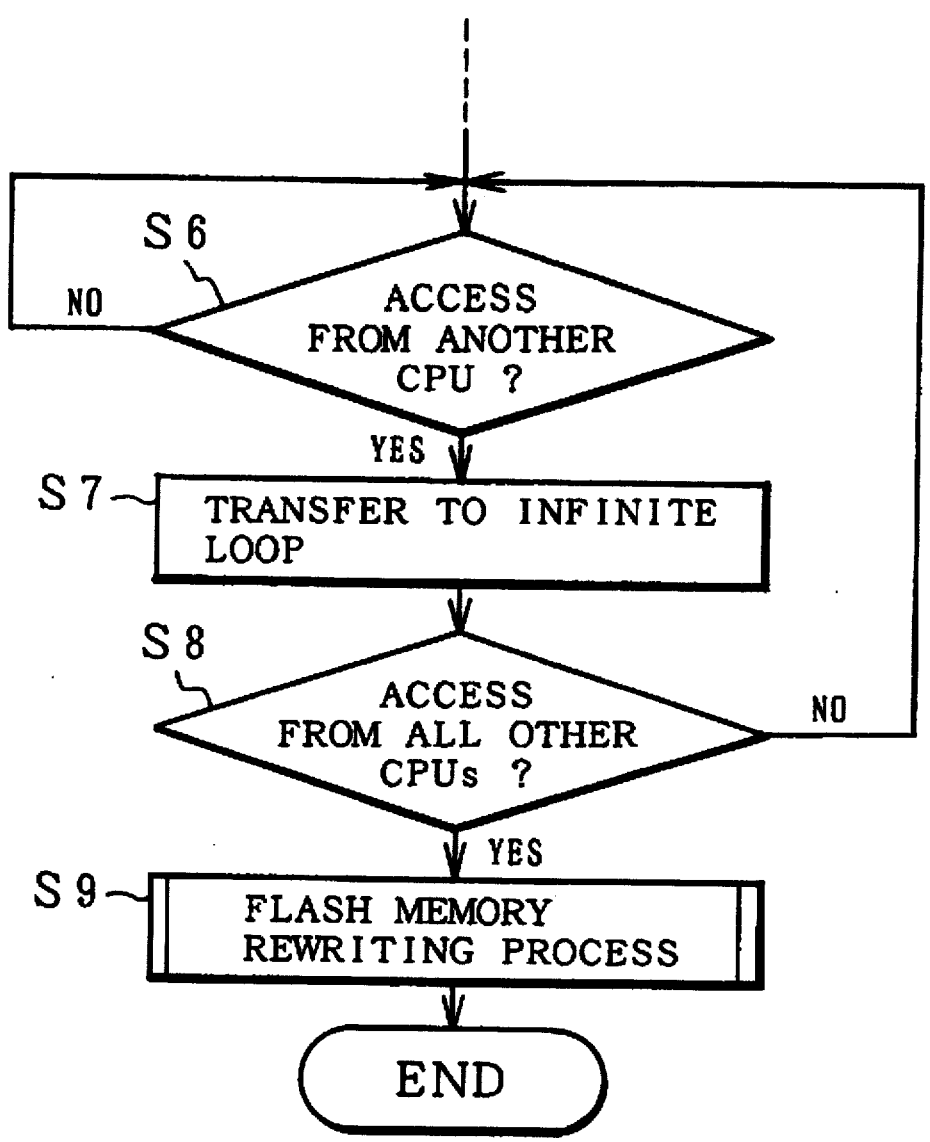
FIG. 13 is a flowchart for another rewriting process by the multi-CPU construction.

FIG. 13 shows another embodiment of a flowchart for the rewriting process in the multi-processor construction of FIG. 9. Since processes in steps S1 to S5 are the same as those in FIG. 12, only remaining steps S6 to S9 are shown. According to the embodiment of FIG. 13, When the rewriting process of the flash memory 16 is executed by the master CPU, the accesses from the other CPUs 12-1 to 12-m are inhibited by the self-branch. Namely, when the access from the other CPU is recognized in step S6, the rewrite activating program shifts the process of such a CPU to the infinite loop in step S7. Therefore, since the processes of the other CPUs 12-1 to 12-m enter the infinite loop, the processes are stopped at that time point. The transition to the infinite loop is reported to the master CPU 12-0. When the transition of all of the other CPUs 12-1 to 12-m to the infinite loop is recognized in step S8, the rewriting process of the flash memory in step S9 is realized by the master CPU 12-0 by the running of the rewriting program in the RAM 18.

[Rewrite flag and restarting process]

Figure 14:
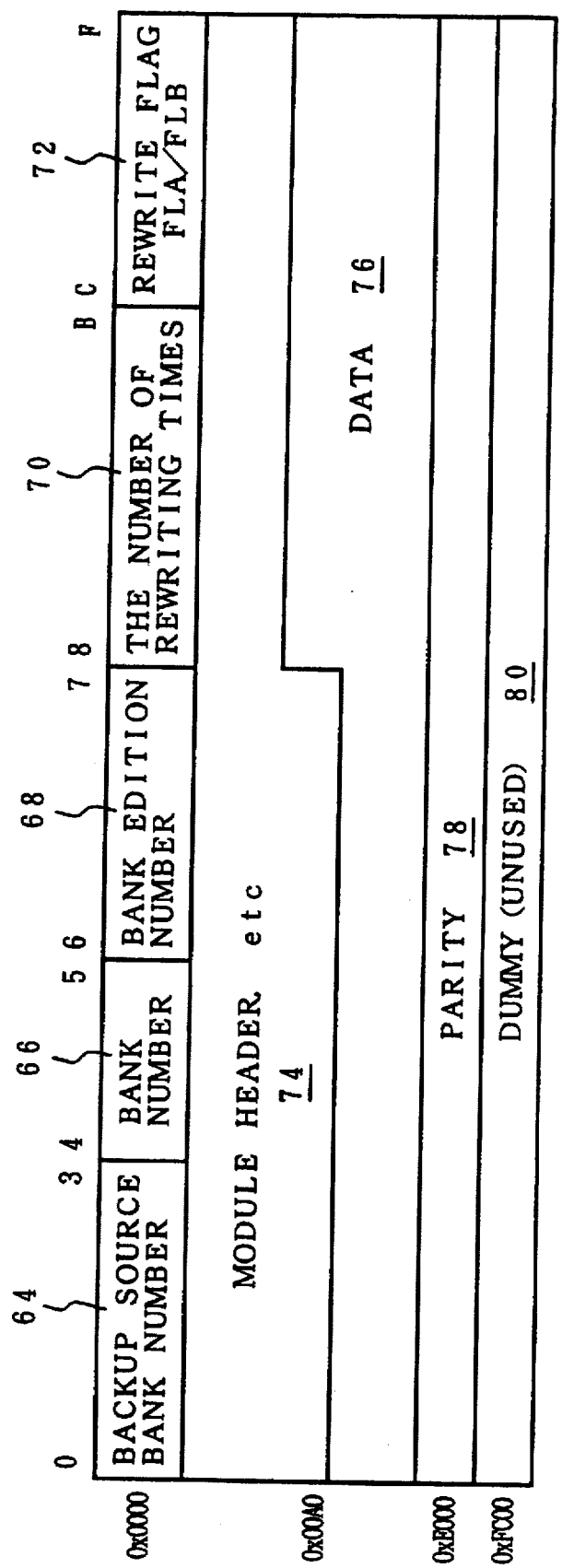
FIG. 14 is an explanatory diagram of the bank contents in a flash memory.

FIG. 14 shows a construction of one bank in the flash memory 18 as a rewriting target of the invention. First, a backup source bank number 64, a bank number 66, a bank edition number 68, the number of rewriting times 70, and a rewrite flag 72 are provided in the bank. The backup source bank number 64 is used in only the backup bank and the other banks are not used. The self bank number is stored in the bank number 66. The bank edition number of new data by the rewriting is stored in the bank edition number 68. The number of data rewriting times of the bank is stored in the number of rewriting times 70. Further, the rewrite flag 72 indicates a state in association with the rewriting of the bank. With respect to the rewriting bank in which the ordinary rewriting is performed, a rewrite flag FLA is stored in the rewrite flag 72. A backup bank flag FLB is stored with respect to the backup bank.

Figure 15A:
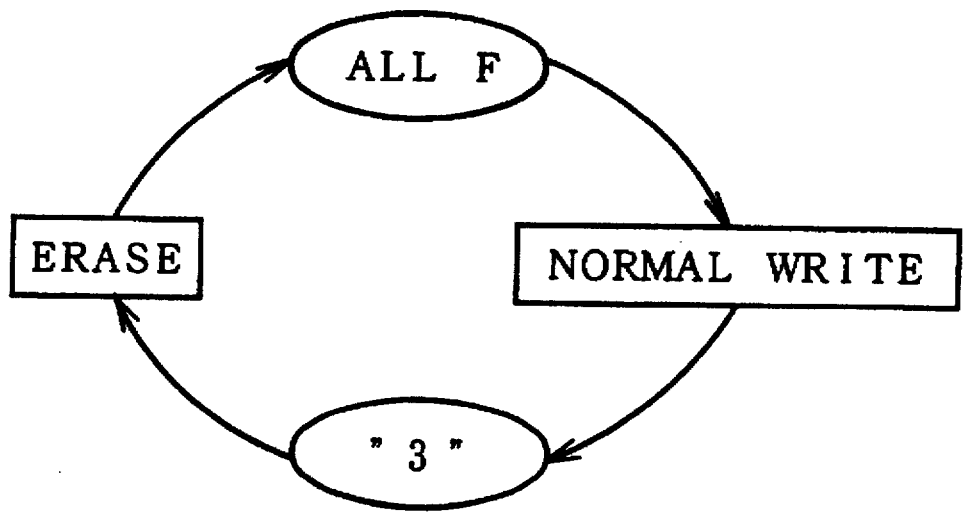
FIGS. 15A and 15B are state transition diagrams of a rewrite flag.
Figure 15B:
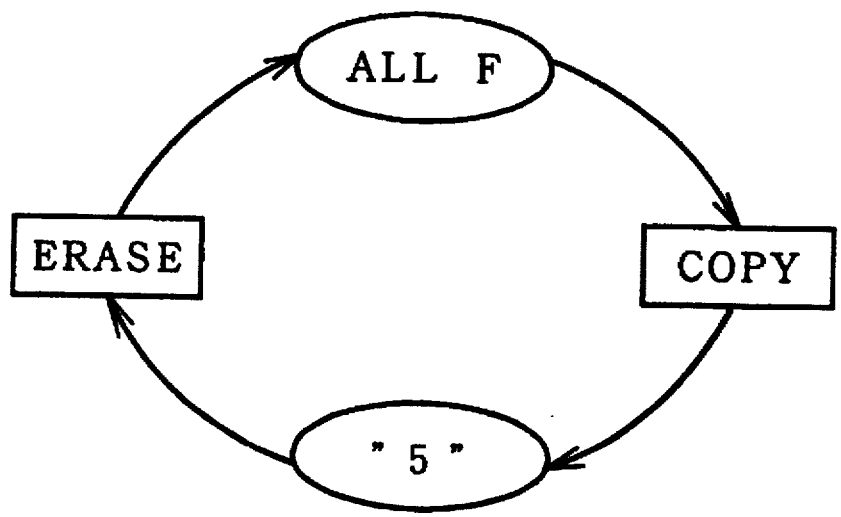

FIGS. 15A and 15B are state transition diagrams of the rewrite flag 72. First, FIG. 15A shows a state transition of the flag FLA of the ordinary bank serving as a rewriting bank. A state of the flag FLA is all F in the initial state or erasing state. When the normal data writing is performed to the bank from the state of all F, the state is shifted to FLA=3. When the bank is erased in the state of FLA=3, the state is shifted to FLA=all F. FIG. 15B is a state transition diagram of the flag FLB of the backup bank. With respect to the backup bank as well, in the initial state or erasing state, FLB=all F. When the data is copied into the backup bank in association with the rewriting process, the state is shifted to FLB=5. When the backup bank is erased after completion of the copy, the state is shifted to FLB=all F.

Again referring to FIG. 14, a module/header portion 74 is provided subsequent to the rewrite flag 72. A data portion 76 is provided after that. Further, a parity 78 is provided. Lastly, an unused dummy area 80 exists. Ordinarily, the parities for all of the data in the non-volatile memory are stored in a lump at one location in another non-volatile memory or the same non-volatile memory. In case of the flash memory, however, since the rewriting process is executed on a bank unit basis, when considering the interruption in the middle of the rewriting, it is desirable that the parities for the data in one bank are provided in the same bank like FIG. 14. Therefore, as shown in FIG. 14, by holding the data portion 76 and parity 78 in the same bank, the rewriting target of the data can be limited to only the inside of the bank. Further, after completion of the writing process or erasing process of each bank, by reading out the data portion 76 and checking the parity 78, the data can be guaranteed every processing step for erasing and copying.

FIG. 16 shows the correspondence relations among the rewriting sequence of the flash memory 16, states of the rewrite flats provided in the rewriting bank and backup bank, and further the data state in each bank. On the basis of those correspondence relations, the processes when they are again activated as shown on the right side are determined. The rewriting process of the rewriting bank is executed at ten stages of sequence Nos. SEQ1 to SEQ10. Namely, the backup bank is cleared by the sequence SEQ1. The reading of the backup bank is checked by the sequence SEQ2. The data is copied from the rewriting bank to the backup bank by the sequence SEQ3. The reading of the backup bank is checked by the sequence SEQ4. The rewriting bank is cleared by the sequence SEQ5. The reading of the rewriting bank is checked by the sequence SEQ6. The rewriting bank is rewritten by the rewrite data prepared in the RAM 18 by the sequence SEQ7. The reading of the rewriting bank after completion of the rewriting is checked by the sequence SEQ8. Lastly, the backup bank is cleared by the sequence SEQ9. The reading of the backup bank after completion of the clearing operation is checked by the sequence SEQ10. A series of processes are finished. For such sequences SEQ1 to SEQ10, the flag FLA of the rewriting bank is set to FLA=3 for a period of time of SEQ1 to SEQ4, thereby indicating that the old data is valid. In the SEQ5, since the rewriting bank is cleared, the rewrite flag FLA becomes unspecified in the middle. After completion of the clearing process, the state is shifted to FLA=all F. For a period of time of the sequences SEQ6 to SEQ8, the state is set to FLA=all F. Since the rewriting of the new data is completed by the sequence SEQ8, FLA=3 for a period of time of SEQ9 to SEQ10, thereby indicating that the new data is valid. On the other hand, in the flag FLB of the backup bank, FLB=all F for the first period of time of the sequences SEQ1 to SEQ4, thereby indicating the clear valid state. When the sequence reaches SEQ5, since the data in the rewriting bank is effectively copied into the backup bank, FLB=5, FLB=5 is maintained until the sequence SEQ8. In the sequence SEQ9, the backup bank is cleared and the FLB becomes unspecified in the middle. After that, the state is shifted to FLB=all F. In the sequence SEQ10, FLB=all F, thereby indicating the clear valid state. With respect to the rewriting bank, the old data is valid for a period of time of the sequence SEQ1 to SEQ4.

The FLB becomes unspecified by the clear on the halfway of the sequence SEQ5. The state is in the erasing state of all F for a period of time from a timing that is slightly before the timing when the sequence enters SEQ6 to the beginning of the sequence SEQ7. Since the new data is rewritten from the halfway of the sequence SEQ7, the state is shifted to the storing state of new data. Further, in the backup bank, the state is in a backup state in which the old data in the rewriting bank was copied for a period of time of SEQ3 to SEQ8.

From the sequence SEQ, the state of the rewrite flag, and the state of the data in the bank in FIG. 16 as mentioned above, the restarting process in the case where the process is interrupted in the middle of the rewriting process and, after that, it is again activated is as shown on the right side. First, when the rewriting process is interrupted for a period of time of the sequences SEQ1 to SEQ4, FLA=3 and FLB=F, so that the interruption state is recognized. Since the old data before rewriting remains as it is in the rewriting bank at this time, it is sufficient to restart the rewriting process from SEQ1. On the other hand, when the process is interrupted for a period of time of the sequences SEQ6 to SEQ8, FLA=all F and FLB =5 and the data in the rewriting bank which was copied into the backup bank is valid. Therefore, it is sufficient to restart the process from the clearing operation of the rewriting bank of the sequence SEQ5. When the rewriting process is interrupted for a period of time between the sequences SEQ9 and SEQ10, FLA=3 and FLB=5 or all F. In this case, since the rewriting of the new data for the rewriting bank has normally been finished, it is sufficient to restart from the clearing operation of the backup bank of the sequence SEQ. On the other hand, in the sequence SEQ5, FLA of the rewriting bank is set to FLA=3 and FLB of the backup bank (FLB=5), so that it is impossible to discriminate whether the data in the rewriting bank is the data before rewriting or the data after the rewriting. Therefore, it is judged that it is impossible to continue the rewriting process. A fact that the recovery is impossible is notified to the operator. In this case, the rewriting bank is once outputted, the contents in the backup bank are copied into the rewriting bank and is returned to the old data, and the rewriting process is restarted from SEQ1.

Figure 17:
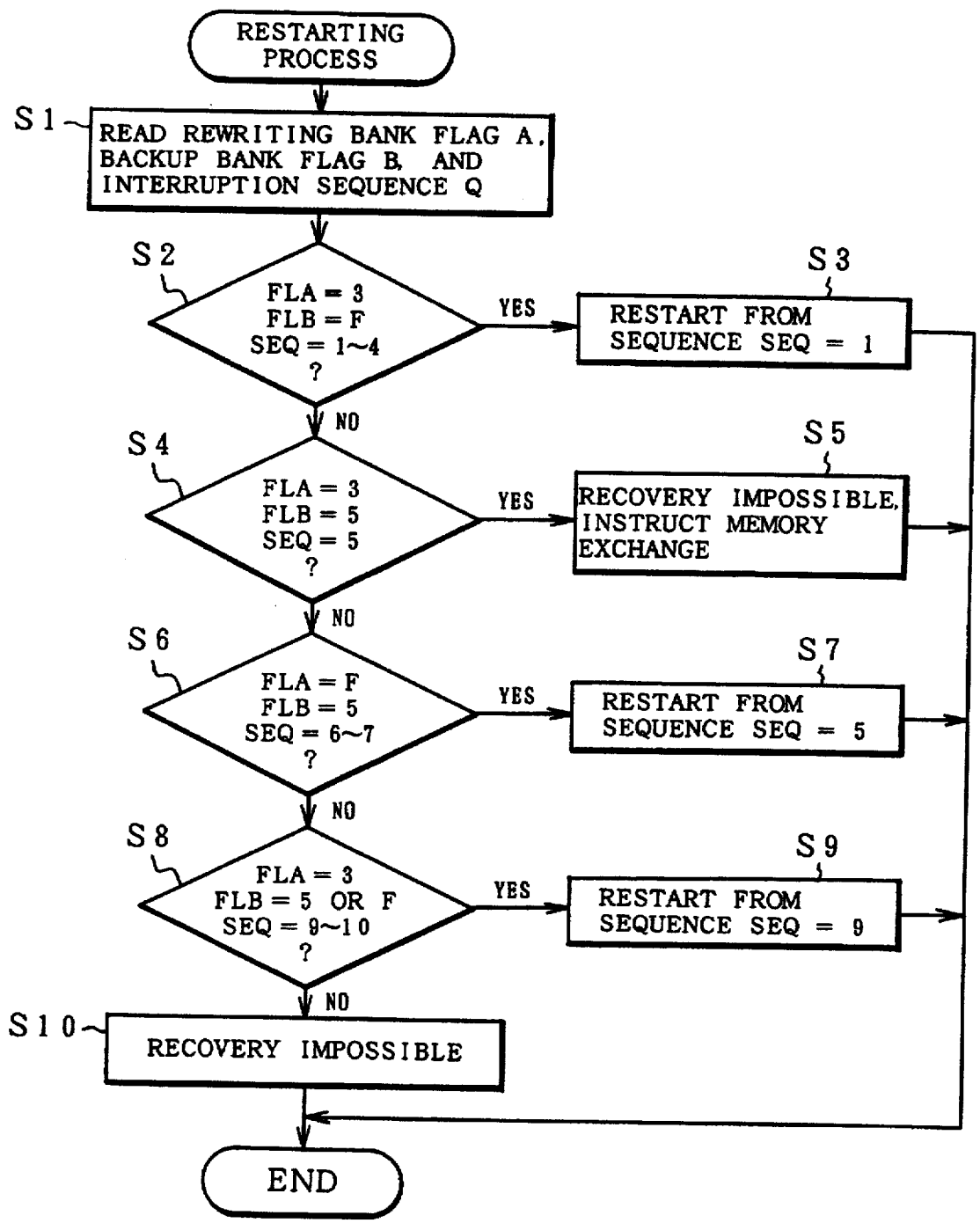
FIG. 17 is a flowchart for a restarting process based on the corresponding relations in FIG. 16.

FIG. 17 is a flowchart for the restarting process based on the correspondence relations in FIG. 16. When the process is interrupted in the middle of the rewriting and is restarted, the rewriting bank flag FLA, backup bank flag FLB, and interruption sequence SEQ are read in step S1. When FLA=3, FLB=F, and SEQ=1 to 4 in step S2, the process is restarted from the sequence SEQ=1 in step S3. When FLA=3, FLB=5, and SEQ=5 in step S4, the recovery is impossible and, for example, a memory exchange is instructed to the operator in step S5. When FLA=F, FLB=5, and SEQ=6~7 in step S6, the process is restarted from the sequence SEQ=5 in step S7. Further, when FLA=3, FLB=5 or all F, and SEQ=9~10 in step S8, the process is restarted from the sequence SEQ=9 in step S9. Further, if NO in all of steps S2 to S8, a state in which the recovery is impossible is notified to the operator in step S12.

[Initial activating program upon restarting]

In an information processing apparatus to which the invention is applied, the initial activating program is first run when the power source of the apparatus is turned on. Just after that, an initial diagnosing program is run, thereby shifting to an operating state. Therefore, even when the process is interrupted during the rewriting of the flash memory due to a shut-off of the power source, if the initial diagnosing program is in an erasing state by the rewriting process, so long as the flash memory is not exchanged, the apparatus itself is not made operative. To avoid such a situation, in the invention, the initial activating program checks the rewrite flags in all of the banks in the flash memory. When the rewriting process is being executed and the rewriting bank is in the erasing state and the backup bank is in the valid state in which the copy has been stored, the mapping address of the rewriting bank by the initial activating program is switched to the backup bank and the apparatus is made operative by the program remaining in the backup bank.

Figure 18:
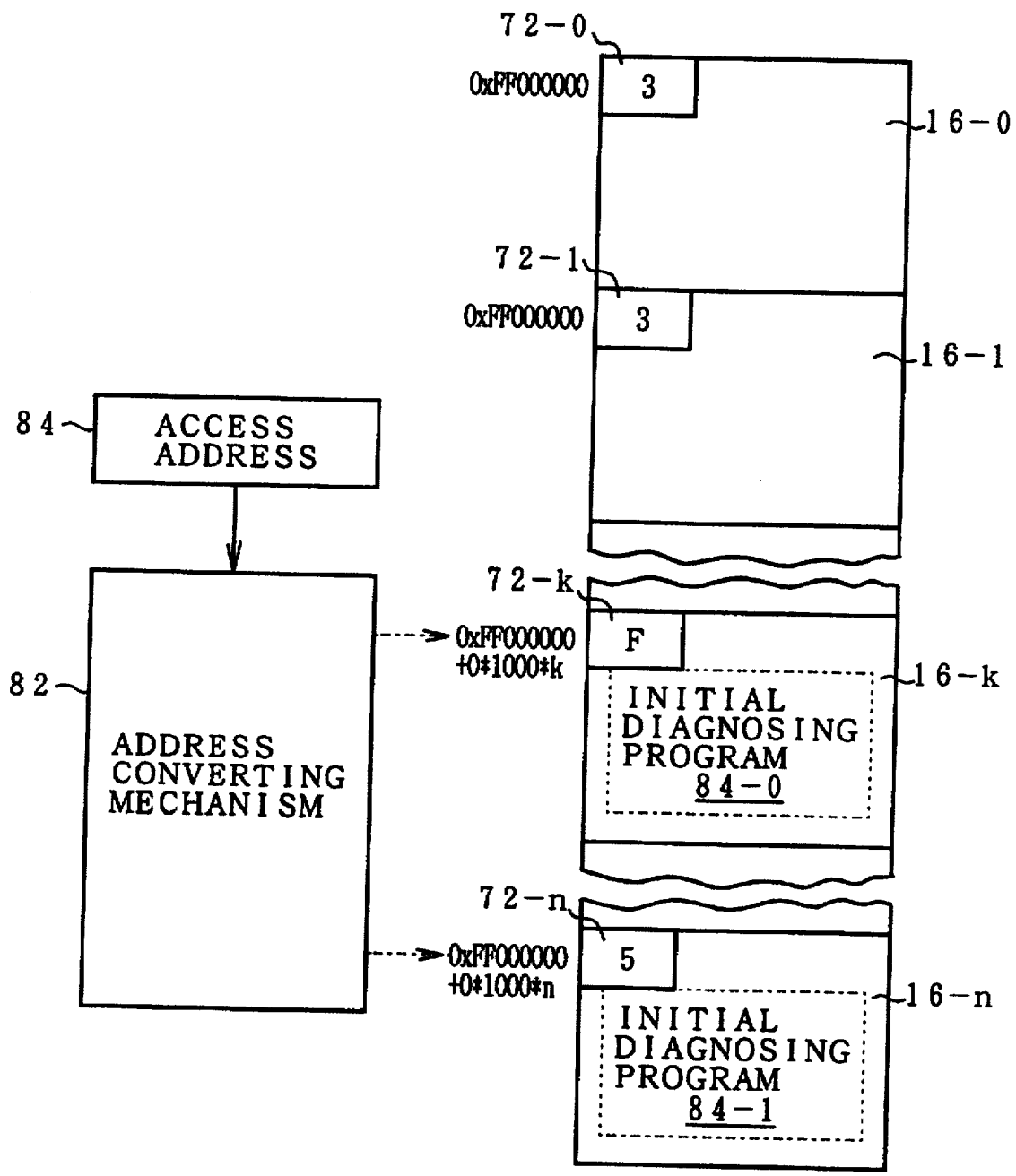
FIG. 18 is an explanatory diagram of an initial activating process by an address conversion in the case where a storage bank of an initializing program is invalid.

FIG. 18 shows a storing state of the flash memory of the initial diagnosing program which runs subsequent to the initial activating program. An initial diagnosing program 84-0 has inherently been stored in the rewriting bank 16-k. When the process is interrupted, it is assumed that the rewriting bank 16-k is in the erasing state and the initial diagnosing program 84-1 effectively exists in the backup bank 16-n by the copy of the rewriting bank 16-a. To enable the apparatus to be made operative upon restarting due to the interruption of the rewriting process, the initial activating program activated upon restarting converts an access address 84 from the initial activating program for the rewriting bank 16-k in which the inherent initial diagnosing program 84-0 has been stored to an address in the backup bank 16-n by an address converting mechanism 82, develops an initial diagnosing program 84-1 stored in the backup bank 16-n into the RAM 18, and can execute the initial diagnosing process. Such a function of the address converting mechanism 82 can be realized by controlling, by the initial activating program, a hardware such as a memory management unit or the like for performing a mapping of a physical address for the flash memory and a logic address which is handled by the CPU. Namely, the access address 84 is mapped in an address 0xFF000000+0*1000*k in the rewriting bank 16-k. On the other hand, the access address 84 from the initial activating program upon restarting after the rewriting process was interrupted is converted to an address 0xFF000000+0*1000*n in the backup bank 16-n. To enable the normal activation of the initial diagnosing program by such an initial activating program, in the case where the initial activating program has been stored in an arbitrary bank in the flash memory 16, it is necessary to inhibit the rewriting by the rewriting program for the bank in which the initial activating program has been stored. In the case where the address converting mechanism 82 of the mapping address as shown in FIG. 18 is provided for the initial activating program, when restarting the rewriting process from the sequence SEQ5 in FIG. 16 by the restarting process by the rewriting program activated after the rewriting process was interrupted, the address converting function which converted the access address to the backup bank is returned to the original state. After that, it is necessary to execute a rewrite restarting process from the sequence SEQ5 .

As mentioned above, the rewrite flags in all of the banks are checked by the initial activating program which is executed at the time of turn-on of the power source. If any one of the banks is in the erasing state by the interruption of the previous rewriting process, the rewriting process is again executed to the rewriting bank in the erasing state by the function for converting the address in the rewriting bank in the erasing state to the address in the backup bank. Until the bank is recovered to the normal data state, the operation of the apparatus can be continued by using the data stored in the backup bank.

Figure 19:
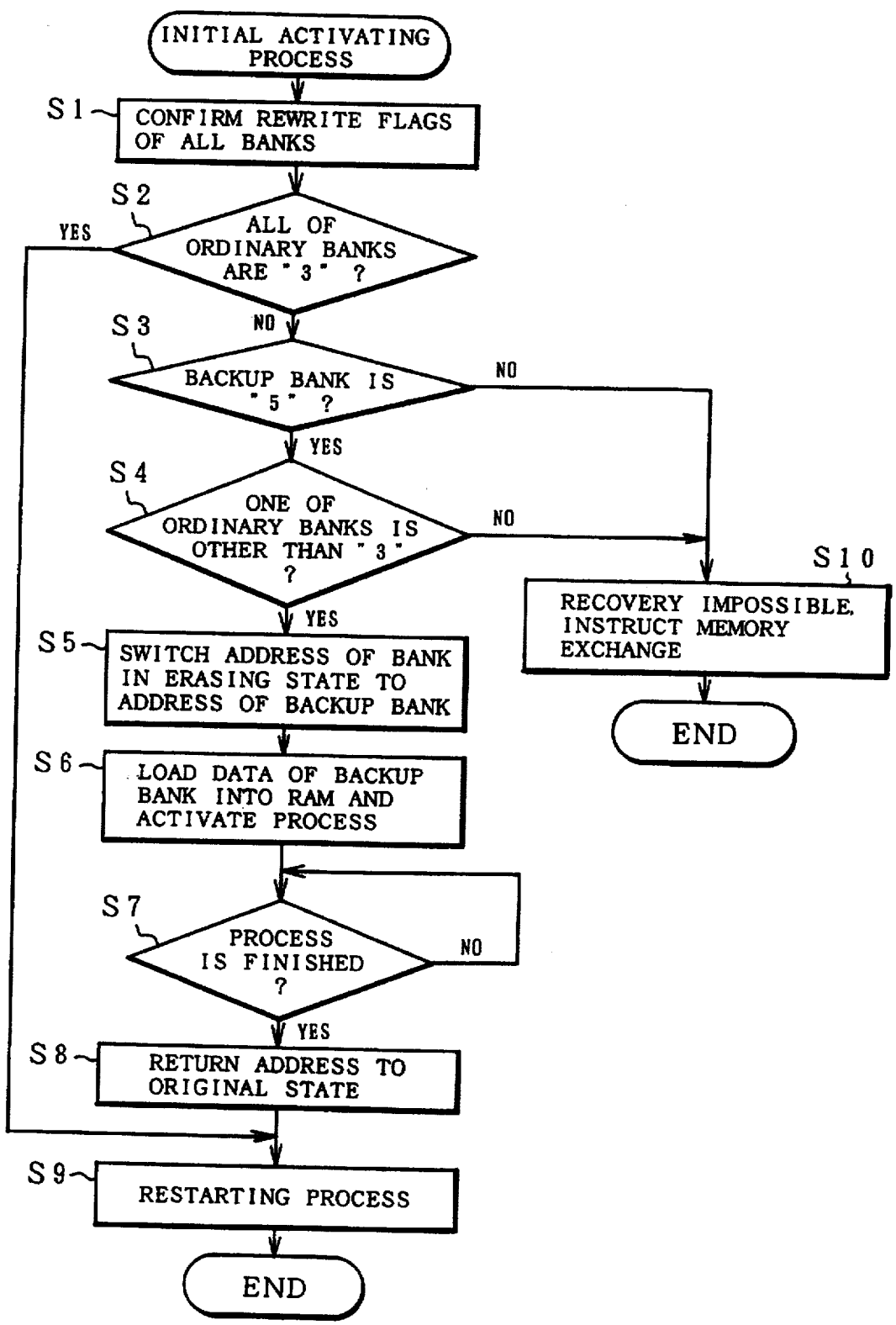
FIG. 19 is a flowchart for an initial activating process at the time of a restarting process.

A flowchart of FIG. 19 relates to the process of the initial activating program for realizing the conversion of the access address from the rewriting bank in a data transmitting state in FIG. 18 to the backup bank. First, the initial activating program checks the rewrite flags in all of the banks in step S1. In step S2, a check is made to see if the flags FLA of the rewriting banks of the ordinary banks other than the backup bank is FLA=3 or not. When all of the flags FLA=3, this means that none of the banks is in a lost state of the data. Therefore, the restarting process according to FIG. 16 is executed in step S9. If any one of the banks is FLA≠3, since it is in a data lost state. Therefore, a check is made in step S3 to see if the backup bank is FLB=5 or not, namely, whether the backup has effectively been performed or not. If the backup bank is FLB≠5, it is judged in step S10 that the recovery is impossible, so that the memory exchange is instructed. When the backup bank is valid to be FLB=5 in step S3, a check is made in step S4 to see if one of the ordinary banks is other than FLA=3, namely, whether only one of the ordinary banks is in the data transmitting state or not. When two or more of the ordinary banks are in the data transmitting state, in step S10, it is judged that the recovery is impossible and the memory exchange is instructed. When only one of the ordinary banks is in the data transmitting state, the address conversion for switching the address in the bank in the erasing state to the address of the backup bank is executed in step S5. In step S6, the data is loaded into the RAM 18 by the access of the backup bank based on the address conversion, thereby activating the process. In step S7, when the activated process is finished, the address is returned to the original state in step S8. The rewriting process is restarted in step S9.

[Bank storage of rewriting program]

Figure 20:
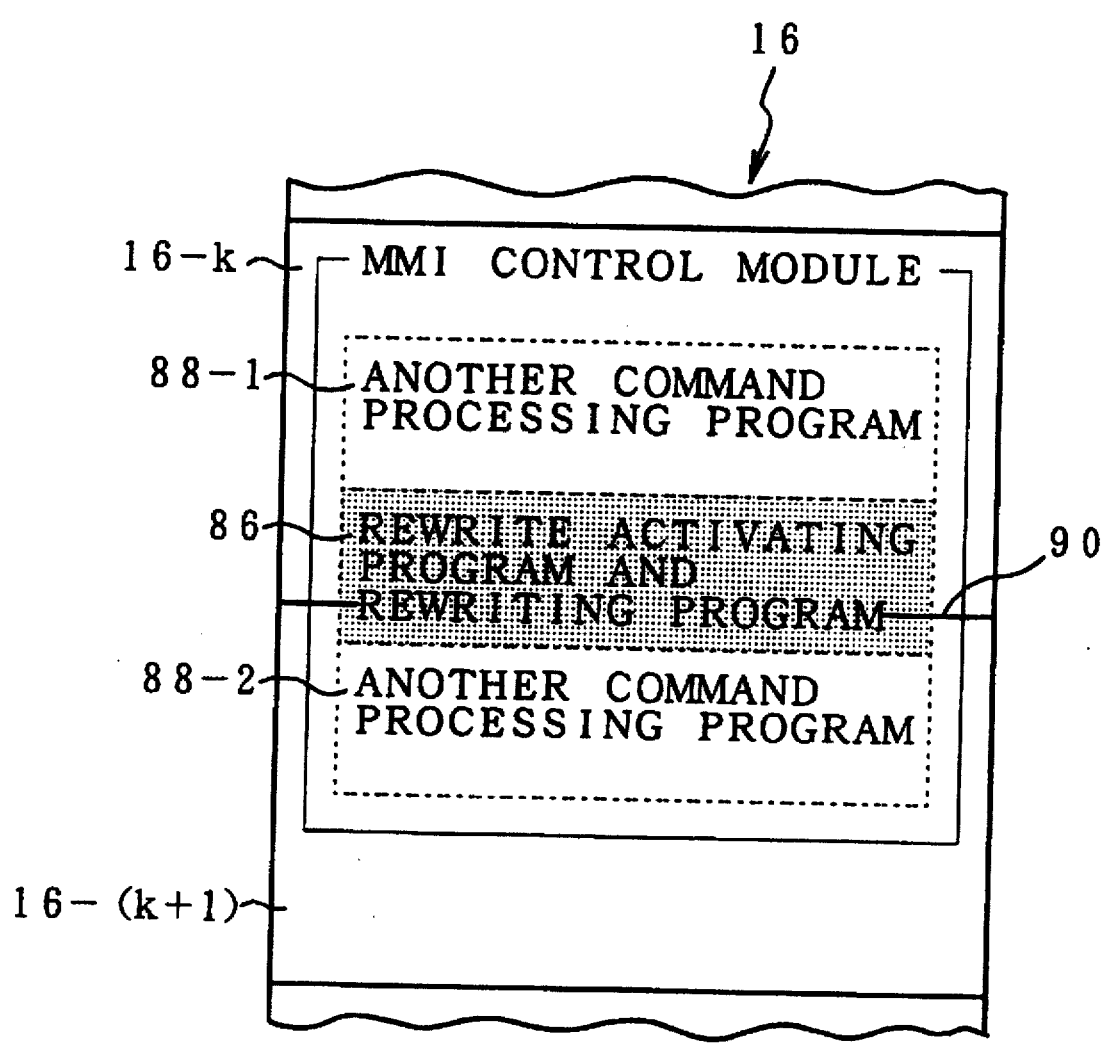
FIG. 20 is an explanatory diagram of a storing state including a bank boundary of a rewrite activating program and a rewriting program.
Figure 21:
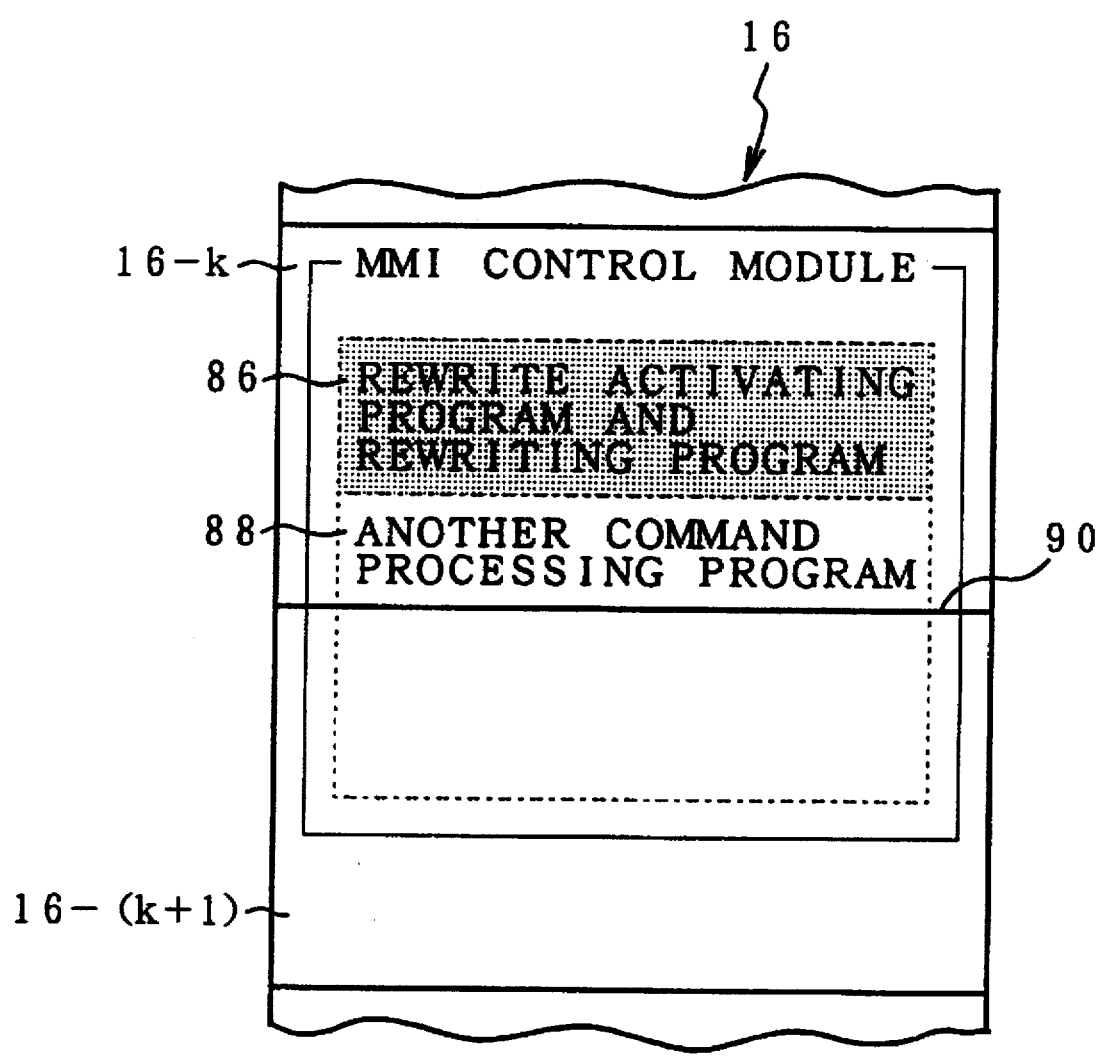
FIG. 21 is an explanatory diagram of a storing state in the case where the rewrite activating program and rewriting program are stored in one bank.

FIG. 20 shows a storing state of the rewrite activating program and rewriting program 86 into the flash memory 16. The rewrite activating program and a rewriting program 86 are parts of other command processing programs 88-1 and 88-2 for processing, for example, commands from the operator. Those programs are stored as one whole control module in the flash memory 16. The control module has a size exceeding a size of one bank of the flash memory 16. Therefore, in the case where the control module is stored in the banks 16-k and 16-(k+1), there is a case where the portions of the rewrite activating program and rewriting program 86 in the control module enter a bank boundary 90. In the case where the control module is formed so that the rewrite activating program and rewriting program exist in two banks 16-k and 16-(k+1), for example, assuming that the rewriting process of the bank 16-k is interrupted by the shut-off of the power source or the like, since the rewrite activating program and rewriting program 86 exist in two banks at the time of the next activation, the apparatus mixedly has both of the new and old edition portions. The rewrite activating program and rewriting program 86 cannot be guaranteed. In the invention, therefore, as shown in FIG. 21, the control module is formed so that the programs regarding the rewriting of the flash memory 16, namely, the rewrite activating program and rewriting program 86 are enclosed in one bank. By forming such a control module, even when the program is abnormally finished due to some reason such as a shut-off of the power source or the like during the rewriting process of the rewrite activating program and rewriting program themselves, it can be recovered by again executing the writing process. Therefore, the process of the rewriting program can be guaranteed.

According to the invention as described above, when the process is interrupted during the rewriting process of a bank unit of the flash memory, by checking the flag information of each bank upon reactivation, the states of the rewriting bank and backup bank are recognized. By restarting the proper rewriting process from the beginning or in the middle of the process in accordance with the state of each bank, even if there is an interruption during the process, the process can be normally finished. Therefore, even if the rewriting process is interrupted in the middle and the data of the rewriting bank is extinguished, the data of the rewriting bank is recovered as much as possible on the basis of the backup bank and the data at the time of the rewriting of the flash memory can be guaranteed. In the multi-processor construction, in a state in which the rewriting process is allocated to a specified processor, by inhibiting the access during the rewriting operation by another processor, the interruption of the rewriting process by the access of the other processor can be certainly prevented. The data guarantee upon rewriting of the flash memory that is used as a shared memory in the multi-processor system can be realized.

Although the above embodiment has been shown and described with respect to an example of the flash memory as a non-volatile memory for rewriting on a bank unit basis, the invention is not limited to such a memory. The invention can be applied as it is to other proper memory which needs a similar rewriting of a bank unit. The present invention is not limited by the numerical values shown in the embodiments.

What is claimed is:

1. An apparatus for rewriting a memory, comprising:
   a memory which is constructed by a plurality of banks and can be rewritten on a bank unit basis;
   a first bank allocated to at least one of said plurality of banks as a backup bank;
   rewrite processing means for copying data of a second bank into said first bank when a rewriting instruction is received, for writing new data into said second bank after that, and for clearing said first bank after completion of said writing operation; and
   flag setting means for setting flag information indicating whether the data is valid or invalid into said plurality of banks.

2. An apparatus according to claim 1, wherein said flag setting means sets an invalid flag in an initial state or a copy erasing state and sets a valid flag in a backup state in which the data has been copied with respect to said first bank, and said flag setting means sets an invalid flag in an initial state or an erasing state and sets a valid flag in a data writing state with respect to said second bank.

3. An apparatus according to claim 2, wherein at the start of the rewriting operation, said rewrite processing means checks the flag information in each of said banks, and only when all of the banks excluding said first bank are valid, said rewrite processing means starts the rewriting process, and when any one of the banks is invalid, said rewrite processing means finishes the process as an abnormality.

4. An apparatus according to claim 2, wherein said rewrite processing means checks the flag information in all of the banks before the start of the rewriting operation, and when the second bank is valid and the first bank is also valid, said rewrite processing means copies the data of said second bank into said first bank and writes new data after that and also clears said first bank after completion of the writing operation.

5. An apparatus according to claim 2, wherein said rewrite processing means checks the flag information in all of the banks before the start of the rewriting operation, and when the second bank is invalid and the first bank is valid, said rewrite processing means writes new data into said second bank and clears said first bank after completion of said writing operation.

6. An apparatus according to claim 2, wherein said rewrite processing means checks the flag information in all of the banks before the start of the rewriting operation, and when the second bank is valid and the first bank is invalid, said rewrite processing means clears said first bank.

7. An apparatus according to claim 1, wherein after completion of the data writing, copying, or clearing of each of said banks, said rewrite processing means verifies the data in the bank and executes a next process after it was confirmed that said data is normal.

8. An apparatus according to claim 1, wherein when the data of said second bank is copied into said first bank, said first processing means stores information indicative of a backup source.

9. An apparatus according to claim 1, wherein when a rewriting instruction is recognized by a processor, in a state in which a rewriting program is loaded in said work memory of the same bank by executing a rewrite activating program stored in a specified bank in said memory, the program is executed by said processor, thereby realizing the processes of said rewrite processing means and said flag setting means.

10. An apparatus according to claim 1, wherein a certain specified bank among said plurality of banks in said memory is set to a rewrite inhibition bank, an initial activating program for activating an initial process to turn on a power source of the apparatus is stored in said rewrite inhibition bank, and when the power source of the apparatus is turned on, a processor accesses said initial activating program and starts an initial process.

11. An apparatus according to claim 10, wherein said processor checks the flag information in all of the banks in said memory at the time of said initial process, and when said first bank is valid, said processor writes back the data in said first bank into the bank of the backup source and, thereafter, executes a next process.

12. An apparatus according to claim 1, wherein an initial activating program for activating an initial process at the time of turn-on of a power source of the apparatus has been stored in a certain specified bank in said memory, said processor checks the flag information in all of the banks in said memory at the time of said initial process, and when the bank in which said initial activating program has been stored is invalid and said first bank is valid, an access address to said initial activating program by said processor is converted to an address of said first bank, the initial activating program in said first bank is loaded into a work memory, and after that, the initial process is started.

13. An apparatus according to claim 1, wherein said rewrite processing means inhibits accesses other than the rewriting to said memory during the rewriting operation.

14. An apparatus according to claim 13, wherein said rewrite processing means copies a program of the bank which is activated by another access during the rewriting operation into a work memory and inhibits an access to said memory during the rewriting operation.

15. An apparatus according to claim 1, wherein when a plurality of processors operate while sharing said memory and a work memory, a specified processor to execute a rewriting process is set to a main processor, and when a rewriting instruction is received, said main processor inhibits an access to said memory by the other processor and, after that, starts the rewriting process.

16. An apparatus according to claim 15, wherein when the rewriting instruction is received, said main processor copies a rewriting program in said memory to realize said rewrite processing means into said work memory, and after completion of the copy, instructs the other processor so as to jump to the rewriting program in said work memory when accessing to said memory, the other processor which received said instruction jumps to the rewriting program in said work memory and, after that, notifies the execution of the jump to said main processor and shifts to an infinite loop, and after confirming that all of the other processors jumped to the rewriting program in said work memory, said main processor itself also jumps to said rewriting program and starts the rewriting process of said memory.

17. An apparatus according to claim 15, wherein when the rewriting instruction is received, said main processor copies a rewriting program in said memory to realize said rewrite processing means into said work memory and halts all of the other processors after that, and after completion of the halting, said main processor jumps to the rewriting program in said work memory and starts the rewriting process of said memory.

18. An apparatus according to claim 1, wherein said rewrite processing means checks a rewriting format added to new data for rewriting prepared in a work memory and, in the case where said rewriting format instructs a rewriting of all data in the second bank, said rewrite processing means starts the rewriting process of said memory on a bank unit basis by using said new data as it is, and in the case where said rewriting format instructs the rewriting of partial data in the second bank, said rewrite processing means copies all of the data in the second bank into said work memory and rewrites said partial data by said new data and, after that, starts the rewriting process of said memory by using the data after completion of the rewriting operation.

19. An apparatus according to claim 18, wherein in the case where said rewriting format instructs the rewriting of partial data of the second bank and also indicates the presence of old data, said rewrite processing means copies all of the data of the second bank into said work memory, checks the old data, starts the rewriting process of said memory by using the data a part of which was rewritten by new data when said old data is normal, and finishes the rewriting process as an abnormality when said old data is abnormal.

20. An apparatus according to claim 1, wherein said memory holds a parity of the data of each bank into the same bank, thereby enabling the data to be rewritten for only the inside of said bank as a target.

* * * * *